(12) United States Patent
Hansen

(10) Patent No.: US 8,089,890 B2
(45) Date of Patent: Jan. 3, 2012

(54) TRANSMITTING HIGH RATE DATA WITHIN A MIMO WLAN

(75) Inventor: Christopher J. Hansen, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 960 days.

(21) Appl. No.: 11/858,282

(22) Filed: Sep. 20, 2007

(65) Prior Publication Data

US 2008/0043872 A1   Feb. 21, 2008

Related U.S. Application Data

(62) Division of application No. 10/973,687, filed on Oct. 26, 2004, now Pat. No. 7,417,974.

(60) Provisional application No. 60/562,206, filed on Apr. 14, 2004.

(51) Int. Cl.
    *H04B 7/02* (2006.01)
(52) U.S. Cl. ......... 370/252; 370/334; 455/101; 455/272

(58) Field of Classification Search .................. None
    See application file for complete search history.

(56) References Cited

U.S. PATENT DOCUMENTS

| | | | |
|---|---|---|---|
| 6,172,993 B1 * | 1/2001 | Kim et al. .................... 375/354 |
| 6,728,517 B2 * | 4/2004 | Sugar et al. .................... 455/272 |
| 7,058,367 B1 * | 6/2006 | Luo et al. .................... 455/101 |
| 7,421,039 B2 * | 9/2008 | Malaender et al. ........... 375/267 |
| 7,505,788 B1 * | 3/2009 | Narasimhan ............... 455/67.11 |
| 7,570,697 B2 * | 8/2009 | van Nee ......................... 375/260 |
| 2005/0135517 A1 * | 6/2005 | Coffey et al. .................. 375/347 |

* cited by examiner

*Primary Examiner* — John Pezzlo
*Assistant Examiner* — Matthew Campbell
(74) *Attorney, Agent, or Firm* — Garlick Harrison & Markison; Jessica W. Smith

(57) ABSTRACT

A method for transmitting high rate data within a multiple input multiple output (MIMO) wireless local area network (WLAN) begins by determining a data transmission rate. The method continues by, when the data transmission rate is between a first data rate and a second data rate, enabling two transmission paths. The method continues by, for each of the two transmission paths, determining at least one of: level of constellation, number of data subcarriers, rate code, and cyclic prefix duration.

20 Claims, 19 Drawing Sheets

TRANSMITTING HIGH RATE DATA WITHIN A MIMO WLAN

This patent application is a divisional application claiming priority under 35 USC §120 to co-pending utility patent application entitled TRANSMITTING HIGH DATA RATE WITHIN A MIMO WLAN, application Ser. No. 10/973,687, and a filing date of Oct. 26, 2004 which claims priority under 35 USC §119(e) to provisional patent application entitled ISSUES ON RATES AND MODES FOR 802.11N, a provisional Ser. No. 60/562,206, and a provisional filing date of Apr. 14, 2004.

BACKGROUND OF THE INVENTION

1. Technical Field of the Invention

This invention relates generally to wireless communication systems and more particularly to interoperability within a wireless communication system between next generation and legacy wireless terminals.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11 (Wireless Local Area Networks "WLANs), Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is further known, the data recovery stage performs numerous operations to recover data from the filtered signals. Such operations include, for an IEEE 802.11a or IEEE 802.11g compliant receiver, guard interval removal, fast Fourier transform, de-mapping and slicing, de-interleaving, and decoding. The decoding utilizes a channel estimation to produce the recovered data from de-interleaved data. In accordance with the IEEE 802.11a and/or IEEE 802.11g standard, a frame includes a short training sequence (STS), a long training sequence (LTS), a signal field, and a plurality of data fields. The IEEE 802.11a and/or IEEE 802.11g standard further indicates that channel estimation is to be done during the long training sequence. Once the channel estimation is determined, it is used for the remainder of the frame.

Currently, next generation WLANs are being developed that will co-exist with IEEE 802.11a, IEEE 802.11b, and/or IEEE 802.11g stations (STAs) and access points (APs). One contemplated next generation system includes a Multi-Input-Multi-Output (MIMO) interface (802.11n). The MIMO interface of the next generation system must be interoperable with the legacy STAs and base stations. Interoperability requires that the legacy devices identify next generation transmissions and respond accordingly. Such interoperation includes at least two particular operations. In a first operation, an AP supports both legacy and next generation STAs. In a second operation, legacy and next generation STAs share a channel, i.e., co-channel/"overlapping" BSS. In each of these cases the Physical Layer Convergence Procedure (PLCP) header must allow an IEEE 802.11a/b/g STA to identify next generation transmissions and to deassert clear channel assessment (CCA) indication or use a protection mechanism like Request-to-Send/Clear-to-Send (RTS/CTS) or CTS-to-sent procedures to avoid conflict with the transmissions. In each of these cases, the next generation preamble must be backwards compatible in order to allow the legacy devices to recognize the next generation transmissions.

Next generation devices are required to meet particular data throughput requirements. One such requirement is that an effective data rate should meet or exceed 100 Mbps. This requirement translates to a 130 Mbps requirement at the PHY of the devices. Of course, this higher data rate is satisfied as a tradeoff in reach because transmit power is limited. In meeting these requirements, the characteristics of the transmitter and receiver must be selected. Therefore, a need exists for a next generation that meets these requirements.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
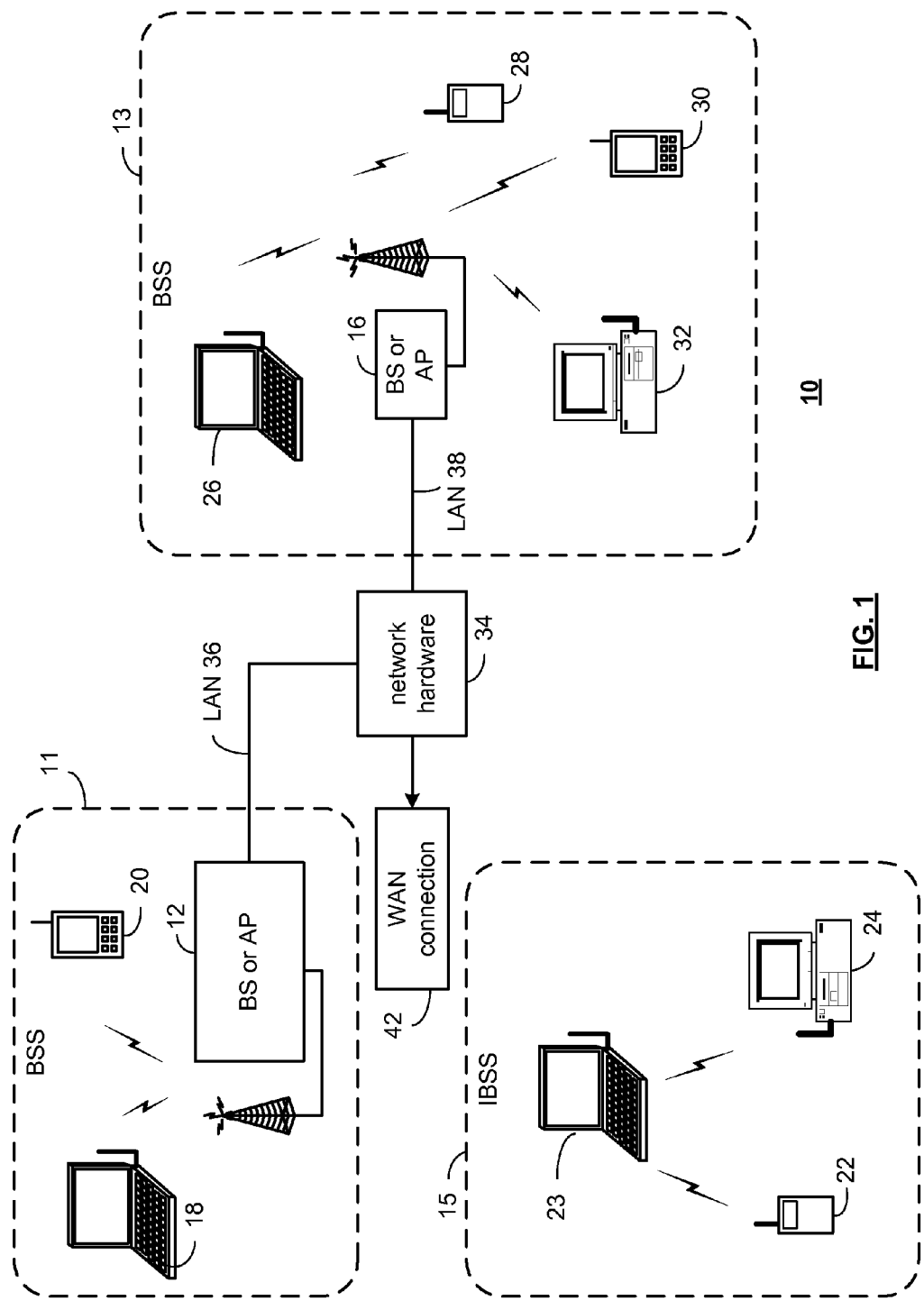
FIG. 1 is a schematic block diagram of a wireless communication system in accordance with the present invention.

FIG. 1 is a schematic block diagram illustrating a communication system 10 that includes a plurality of base stations and/or access points 12 and 16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of at least some of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12 and 16 has an associated antenna or antenna array to communicate with the wireless communication devices in its regional area, which is generally referred to as a basic service set (BSS) 11, 13. Typically, the wireless communication devices register with a particular base station or access point 12 or 16 to receive services from the communication system 10.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Wireless communication devices 22, 23, and 24 are located in an area of the wireless communication system 10 where they are not affiliated with an access point. In this region, which is generally referred to as an independent basic service set (IBSS) 15, the wireless communication devices communicate directly (i.e., point-to-point or point-to-multiple point), via an allocated channel to produce an ad-hoc network.

Figure 2:
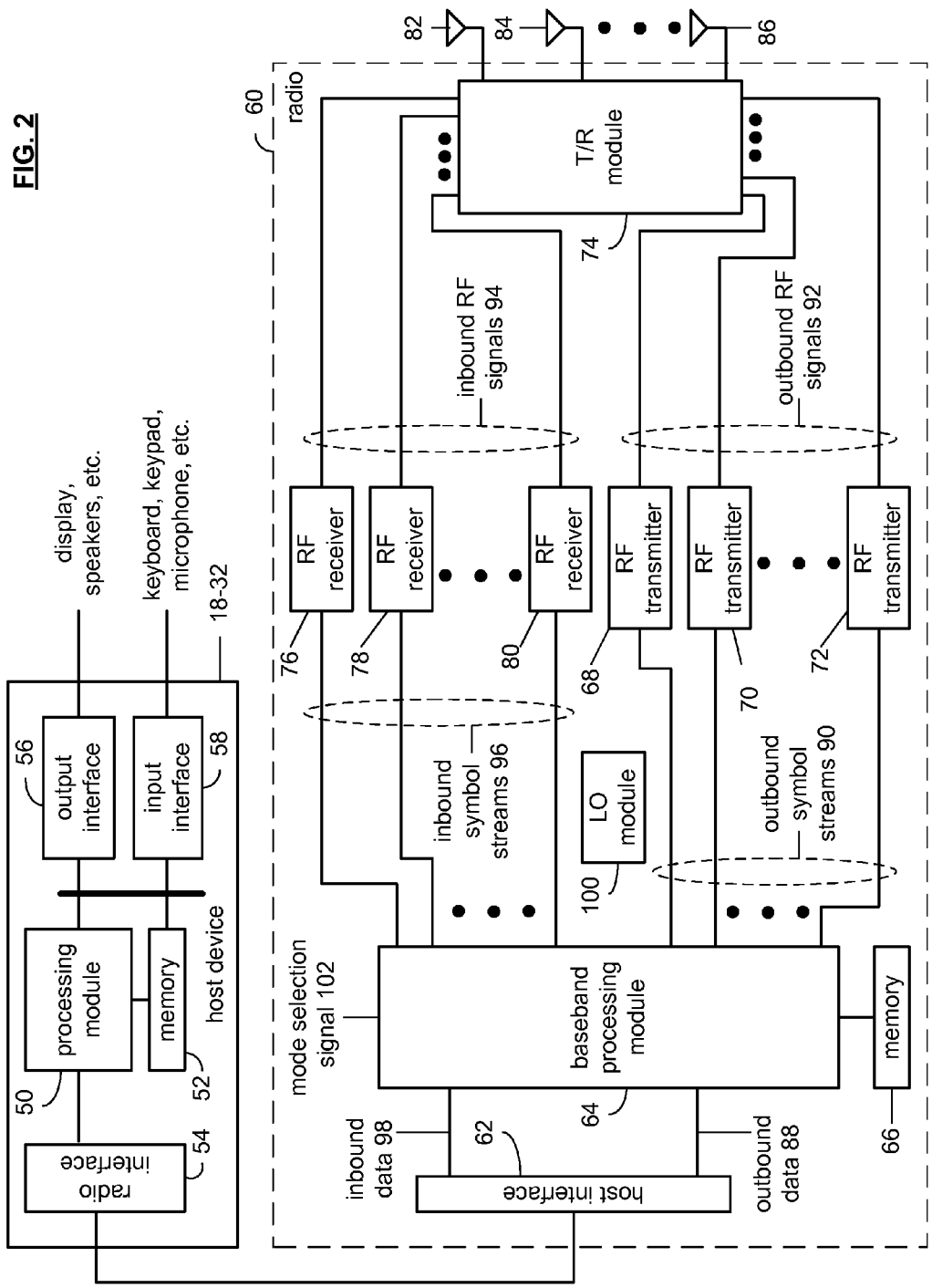
FIG. 2 is a schematic block diagram of a wireless communication device in accordance with the present invention.

FIG. 2 is a schematic block diagram illustrating a wireless communication device that includes the host device 18-32 and an associated radio, or station, 60. For cellular telephone hosts, the radio 60 is a built-in component. For personal digital assistants hosts, laptop hosts, and/or personal computer hosts, the radio 60 may be built-in or an externally coupled component. In this embodiment, the station may be compliant with one of a plurality of wireless local area network (WLAN) protocols including, but not limited to, IEEE 802.11n. The device of FIG. 2 is a Multi-Input-Multi-Output (MIMO) device. IEEE 802.11n devices are referred to herein interchangeably as next generation WLAN devices while IEEE 802.11a/b/g devices are referred to herein as legacy devices, which are Multi-Input-Single-Output (MISO) devices. However, the MISO devices, illustrated in more detail with reference to FIG. 3, must be interoperable with the MIMO device of FIG. 2.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio, or station, 60 includes a host interface 62, a baseband processing module 64, memory 66, a plurality of radio frequency (RF) transmitters 68-72, a transmit/receive (T/R) module 74, a plurality of antennas 82-86, a plurality of RF receivers 76-80, and a local oscillation module 100. The baseband processing module 64, in combination with operational instructions stored in memory 66, execute digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102 may indicate a frequency band of 2.4 GHz, a channel bandwidth of 20 or 22 MHz and a maximum bit rate of 54 megabits-per-second or greater, e.g., 122 MBPS. In this general category, the mode selection signal will further indicate a particular rate. In addition, the mode selection signal may indicate a particular type of modulation, which includes, but is not limited to, Barker Code Modulation, BPSK, QPSK, CCK, 16 QAM and/or 64 QAM.

The baseband processing module 64, based on the mode selection signal 102 produces the one or more outbound symbol streams 90 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennas, the baseband processing module 64 will produce 2, 3 or 4 outbound symbol streams 90 corresponding to the number of antennas from the output data 88.

Depending on the number of outbound streams 90 produced by the baseband module 64, a corresponding number of the RF transmitters 68-72 will be enabled to convert the outbound symbol streams 90 into outbound RF signals 92. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennas 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received. The baseband processing module 60 receives the inbound symbol streams 90 and converts them into inbound data 98, which is provided to the host device 18-32 via the host interface 62. For a further discussion of an implementation of the radio, or station, 60 refer to co-pending patent application entitled WLAN TRANSMITTER HAVING HIGH DATA THROUGHPUT, having a U.S. Provisional Application No. 60/545,854, and a provisional filing date of Feb. 19, 2004 and co-pending patent application entitled WLAN RECEIVER HAVING AN ITERATIVE DECODER, having a U.S. Provisional Application No. 60/546,051 and a provisional filing date of Feb. 19, 2004.

In one embodiment of the radio 60, a method for transmitting high rate data within a multiple input multiple output (MIMO) wireless local area network (WLAN) begins by determining a data transmission rate. The method continues by, when the data transmission rate is between a first data rate and a second data rate, enabling two transmission paths. The method continues by, for each of the two transmission paths, determining at least one of: level of constellation, number of data subcarriers, rate code, and cyclic prefix duration.

In another embodiment of the radio 60, a method for supporting high data rate WLAN communications begins by determining a bandwidth of operation. The method continues by determining a required data throughput rate. The method continues by selecting a number of antennas for use in a Multiple Input Multiple Output (MIMO) baseband signal format. The method continues by selecting a constellation. The method continues by operating a MIMO WLAN transceiver according to the bandwidth of operation, the number of antennas, and the constellation to meet the required data throughput rate.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennas 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
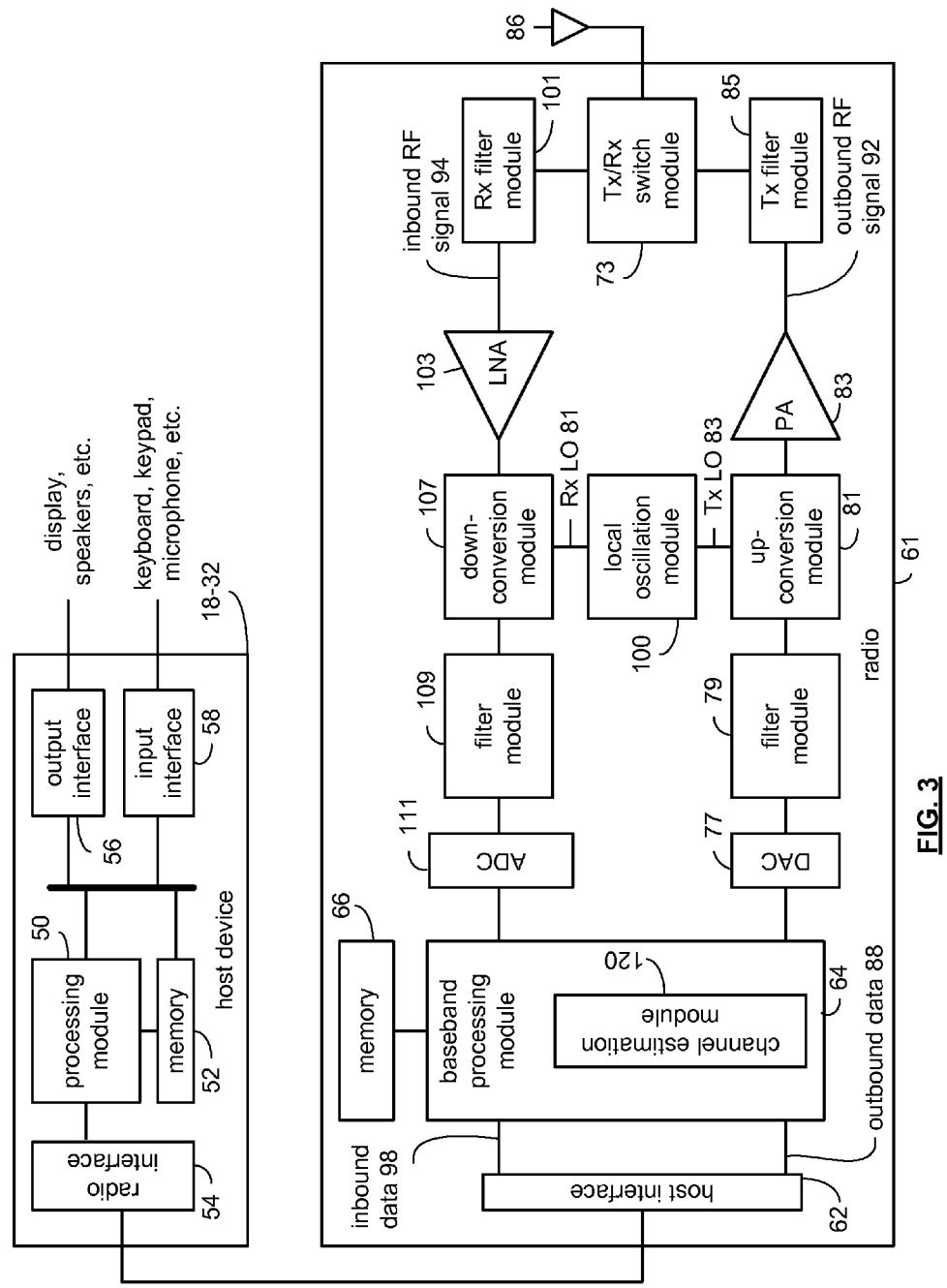
FIG. 3 is a schematic block diagram of a wireless communication device in accordance with the present invention.

FIG. 3 is a schematic block diagram illustrating a wireless communication device that includes the host device 18-32 and an associated radio 61. For cellular telephone hosts, the radio 61 is a built-in component. For personal digital assistants hosts, laptop hosts, and/or personal computer hosts, the radio 61 may be built-in or an externally coupled component. The host device 18-32 operates as discussed above with reference to FIG. 1. The WLAN device of FIG. 3 may operate in compliance with one or more of the IEEE 802.11a/b/g operating standards. As distinguished from the MIMO device of FIG. 2, the device of FIG. 3 is a MISO device.

Radio 61 includes a host interface 62, baseband processing module 64, an analog-to-digital converter 111, a filter module 109, an IF mixing down conversion stage 107, a receiver filter 101, a low noise amplifier 103, a transmitter/receiver switch 73, a local oscillation module 74, memory 66, a digital transmitter processing module 76, a digital-to-analog converter 78, a filter module 79, an IF mixing up conversion stage 81, a power amplifier 83, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant. The baseband processing module 64 functions as described above and performs one or more of the functions illustrated in FIGS. 5-19.

In operation, the radio 61 receives outbound data 88 from the host device via the host interface 62. The host interface 62 routes the outbound data 88 to the baseband processing module 64, which processes the outbound data 88 in accordance with a particular wireless communication standard (e.g., IEEE 802.11a/b/g, Bluetooth, et cetera) to produce outbound time domain baseband (BB) signals.

The digital-to-analog converter 77 converts the outbound time domain baseband signals from the digital domain to the analog domain. The filtering module 79 filters the analog signals prior to providing them to the IF up-conversion module 81. The IF up conversion module 81 converts the analog baseband or low IF signals into RF signals based on a transmitter local oscillation 83 provided by local oscillation module 100. The power amplifier 83 amplifies the RF signals to produce outbound RF signals 92, which are filtered by the transmitter filter module 85. The antenna 86 transmits the outbound RF signals 92 to a targeted device such as a base station, an access point and/or another wireless communication device.

The radio 61 also receives inbound RF signals 94 via the antenna 86, which were transmitted by a base station, an access point, or another wireless communication device. The antenna 86 provides the inbound RF signals 94 to the receiver filter module 101 via the Tx/Rx switch 73. The Rx filter 71 bandpass filters the inbound RF signals 94 and provides the filtered RF signals to the low noise amplifier 103, which amplifies the RF signals 94 to produce amplified inbound RF signals. The low noise amplifier 72 provides the amplified inbound RF signals to the IF down conversion module 107, which directly converts the amplified inbound RF signals into inbound low IF signals or baseband signals based on a receiver local oscillation 81 provided by local oscillation module 100. The down conversion module 70 provides the inbound low IF signal or baseband signal to the filtering/gain module 68. The filtering module 109 filters the inbound low IF signals or the inbound baseband signals to produce filtered inbound signals.

The analog-to-digital converter 111 converts the filtered inbound signals into inbound time domain baseband signals. The baseband processing module 64 decodes, descrambles, demaps, and/or demodulates the inbound time domain baseband signals to recapture inbound data 98 in accordance with the particular wireless communication standard being implemented by radio 61. The host interface 62 provides the recaptured inbound data 92 to the host device 18-32 via the radio interface 54.

As one of average skill in the art will appreciate, the wireless communication device of FIG. 3 may be implemented using one or more integrated circuits. For example, the host device may be implemented on one integrated circuit, the baseband processing module 64 and memory 66 may be implemented on a second integrated circuit, and the remaining components of the radio 61, less the antenna 86, may be implemented on a third integrated circuit. As an alternate example, the radio 61 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 4:
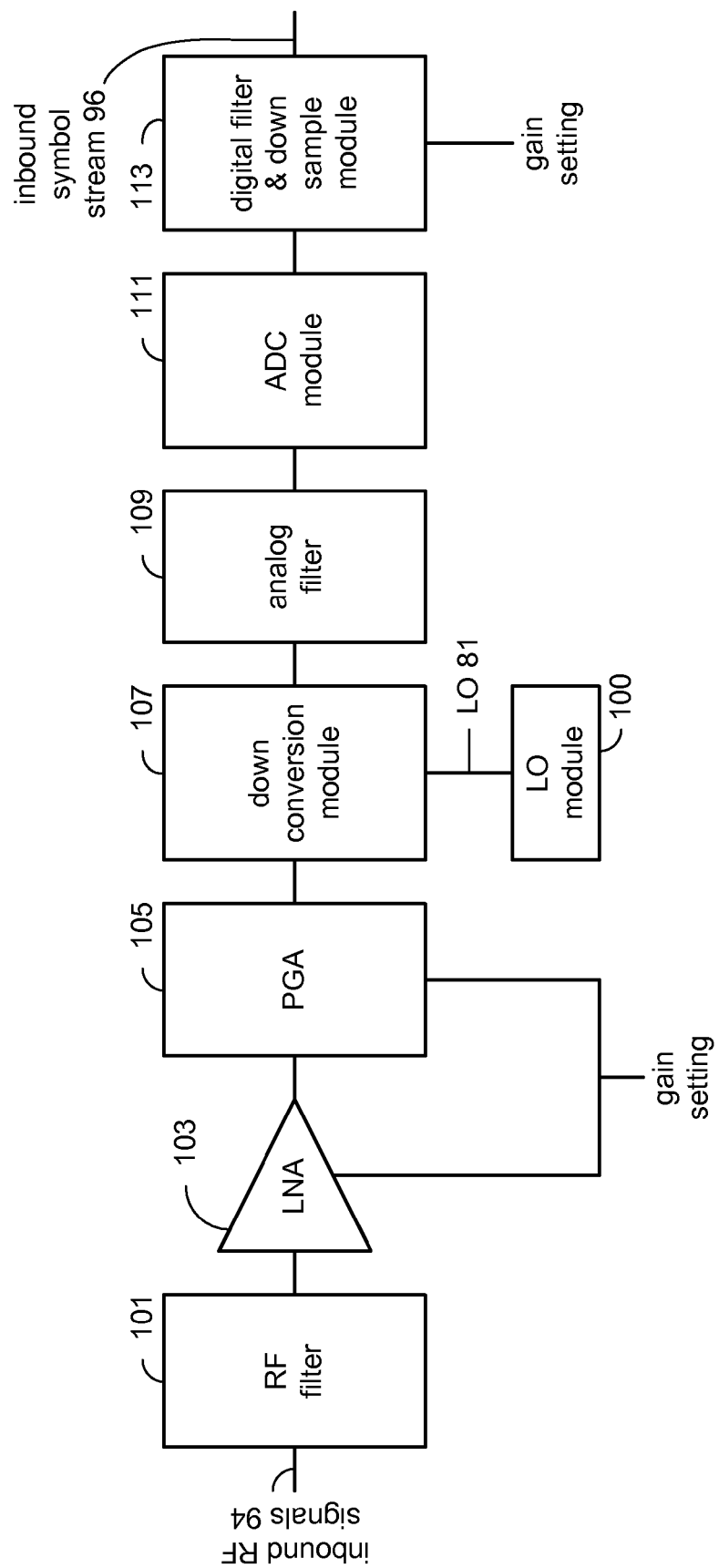
FIG. 4 is a schematic block diagram of a receiver section of the wireless communication device of FIG. 2 in accordance with the present invention.

FIG. 4 is a schematic block diagram of each of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the inbound symbol stream 96.

Figure 5:
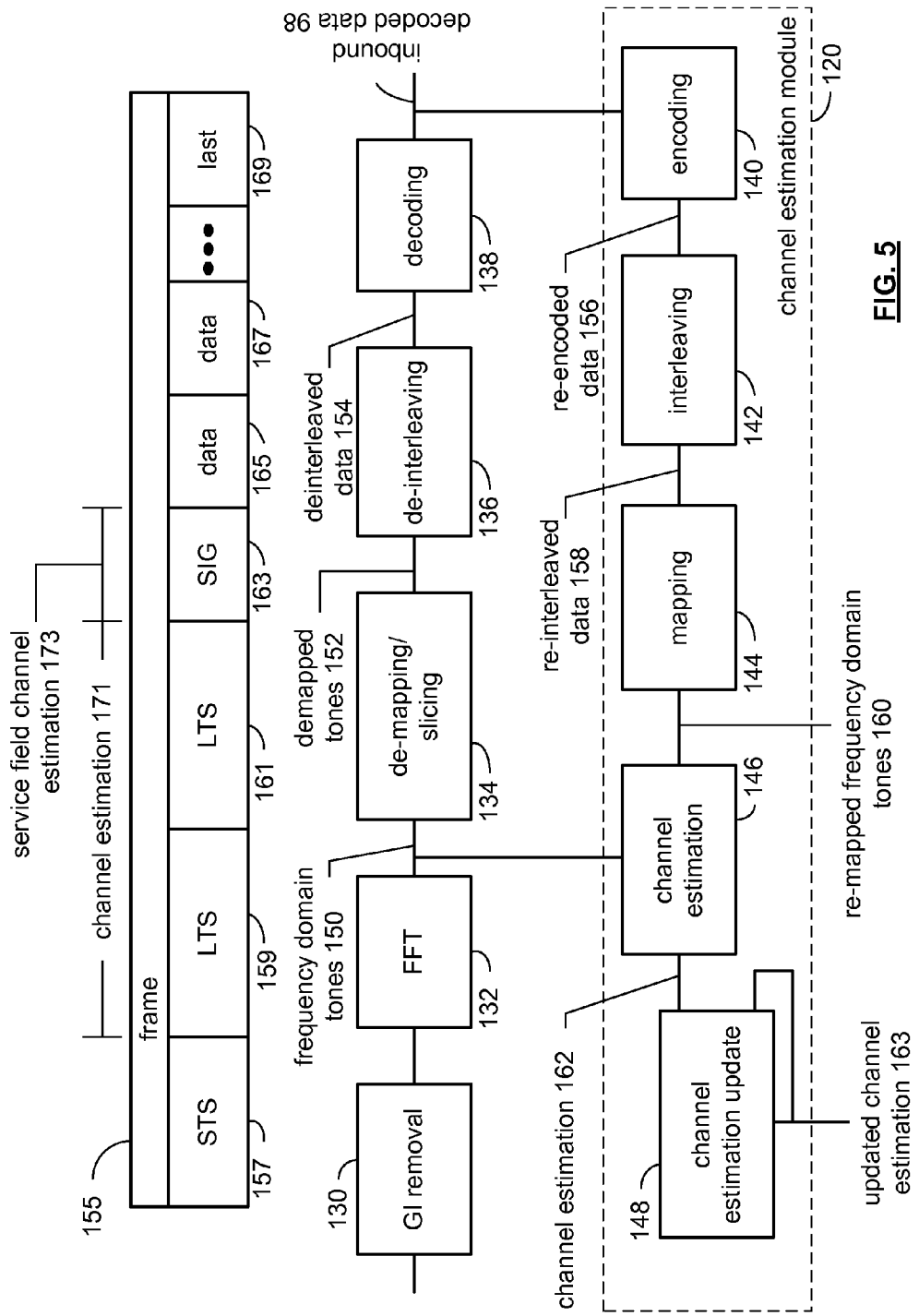
FIG. 5 is a schematic block diagram of an embodiment of a baseband processing module of the wireless communication device of FIG. 3 in accordance with the present invention.

FIG. 5 is a functional schematic block diagram of an implementation of the baseband processing module 64 of FIG. 3. In this embodiment, the baseband processing module 64 is implemented to include a guard interval removal module 130, a fast Fourier transform (FFT) module 132, a demapping/slicing module 134, a deinterleaving module 136, a decoding module 138, and the channel estimation module 120. In this embodiment, the channel estimation module 120 includes an encoding module 140, an interleaving module 142, a mapping module 144, a channel estimation module 146, and a channel estimation update module 148. As is further shown, a frame 155, which may in accordance with IEEE 802.11a and/or IEEE 802.11.g, includes a short training sequence, two long training sequences, a service field, and a plurality of data payload sections.

The baseband processing module 64 processes the sections of frame 155 sequentially. As is known, the baseband processing module 64 processes the short training sequence to recognize the presence of a frame to begin the determination of whether the frame is valid, and to establish initial gain settings of the radio receiver section (e.g., the LNA gain, programmable gain amplifier gain, analog-to-digital gain, et cetera).

The baseband processing module 64 then processes the long training sequences to further establish the validity of frame 155 and via the guard interval removal module 130 to remove the guard intervals that separate the long training sequences. The fast Fourier transform module 132 converts the time domain signals representing the long training sequences into a plurality of frequency domain tones 150. The demapping/slicing module 134 demaps the plurality of frequency domain tones 150 to produce demapped tones 152. The interleaving module 136 deinterleaves the demapped tones 152 to produce deinterleaved data 154. The decoding module 138 decodes the deinterleaved data 154 to produce inbound decoded data 98.

For example, if the baseband processing module 64 is configured to be compliant with IEEE 802.11a and/or 802.11g, the inbound time domain baseband signals are orthogonal frequency division multiplexed (OFDM) modulated signals in the 5 GHz frequency band and/or the 2.4 GHz frequency band. The FFT module 132 converts the time domain signals into a plurality of frequency domain tones. Each of the frequency domain tones represents a sub-carrier of a channel. As is known, in the 802.11a and/or 802.11g standard, there are 48 data sub-carriers and 4 pilot sub-carriers for a total of 52 non-zero sub-carriers of a channel. The remaining 12 sub-carriers of the channel are zero to provide at least a portion of the guard interval. Each tone represents a modulated data that is in accordance with one of PBSK, QPSK, 16 QAM and/or 64 QAM. The demapping determines the particular symbol vector for the corresponding tone which is subsequently deinterleaved via the deinterleave module 136. The decoding module 138, which may be a VITERBI decoder, receives the symbol vectors representing the modulated data and decodes them accordingly to recapture the bits represented by the constellation mapped symbols.

The channel estimation module 120 essentially replicates the baseband transmit function to produce the re-mapped frequency domain tones from decoded data produced by the decoding module 138. As shown, the encoding module 140, which may be a convolutional encoder using rate 1/2, encodes the inbound decoded data bits 98 to produce re-encoded data 156. The encoding module 140 essentially is performing the inverse of the decoding module 138 and is performing the same encoding function that the transmitting wireless communication device used to encode the data that it transmitted to this particular receiver.

The interleaving module 142 interleaves the re-encoded data 156 to produce reinterleaved data 158. The mapping module 144 maps the reinterleaved data 158 to a plurality of remapped frequency domain tones 160. These functions are the inverse, or compliment, of the functions performed by the demapping/slicing module 134 and the deinterleaving module 136.

The channel estimation module 146 utilizes the plurality of remapped frequency domain tones 160 and the plurality of frequency domain tones 150 to produce a channel estimation 162 for the particular portion of the frame being processed. Accordingly, a channel estimation 162 may be produced for the long training sequences yielding an LTS channel estimation, may be performed for the service field, which generally may be referred to as frame information section, to produce a service field channel estimation, and one or more of the data payloads may have a channel estimation 160 determined therefore.

The channel estimation update module 148 receives the channel estimation 162 for the particular section of frame 155 and updates a previous channel estimation to produce an updated channel estimation 163. As one of average skill in the art will appreciate, the LTS channel estimation may be derived in accordance with prior art channel estimations in wireless LAN receivers that were 802.11a and/or 802.11g compliant.

With reference to frame 155, the channel estimation module 120 generates an initial channel estimation for the frame based on the LTS channel estimation. As the service field is being received, the channel estimation module 120 generates a service field channel estimation for the service field. The channel estimation module 120 then updates the channel estimation 163 for the frame based on the initial channel estimation and the newly determined service field channel estimation. When the $1^{st}$ data payload is received, the channel estimation module 120 generates a corresponding channel estimation for this data payload. The previously updated channel estimation is then updated with the $1^{st}$ payload channel estimation. The channel estimation module 120 may determine a corresponding channel estimation for each data payload received and update the current channel estimation 163 accordingly. Alternatively, the channel estimation module 120 may only utilize a set of the data payload sections to determine the updating of the channel estimation 163. Which data payloads to use may be predetermined (for example, use every $4^{th}$ data payload) or may be based on power of the corresponding data payload where the energy level needs to exceed a threshold to be used for an updating of the channel estimation.

As an example of the operational of the channel estimation module 146 and the channel estimation update module 148, let the received FFT output on the $K^{th}$ tone be:

$$Y_k = Z_k H_k + V_k$$

Dropping the subscript k for any tone, the equation can be rewritten as:

$$Y = ZH + V \approx CN(0, \rho^2)$$

where Y is the received frame information section and/or received payload section, H is the corresponding channel estimation, V represents a noise component of the received frame information section and/or the received payload section, and Z represents the plurality of remapped frequency dome tones of the received frame information section and/or received payload section, where Z can be expressed as: $Z = K_{MOD} X$ therefore:

$$Y = (Z_i + jZq)(Hi + jHq) + (Vi + jVq)$$
$$= (Z_i Hi - ZqHq) + j(ZqHi + ZiHq) + (Vi + jVq)$$

therefore:

$$Yi = ZiHi - ZqHq + Vi$$
$$Yq = ZqHi + ZiHq + Vq$$

therefore:

$Zi Yi + Zq Vq = (Zi^2 + Zq^2) Hi + ZiVi + ZqVq$, as such the channel estimation may be expressed as:

$$\hat{H}_{DNi} = \hat{H}_i = \frac{Z_i Y_i + Z_q V_q}{Z_i^2 + Z_q^2}$$

$$\hat{H}_i = H_i + \frac{Z_i Y_i + Z_q V_q}{Z_i^2 + Z_q^2}$$

$$= \frac{Z_i^2 \sigma^2 + Z_q^2 \sigma^2}{(Z_i^2 + Z_q^2)^2}$$

$$= \frac{\sigma^2}{(Z_i^2 + Z_q^2)^2}$$

$$= \frac{\sigma^2}{K_{MOD}^2 (X_i^2 + X_q^2)}$$

As a further example, constellation points with high energy may be used to minimize estimation noise. For instance, consider 64 QAM, where $$K_{mod} = \frac{1}{42}$$

$$\frac{\sigma^2}{K_{MOD}^2(X_i^2 + X_q^2)} = \frac{42\sigma^2}{(X_i^2 + X_q^2)}$$

From this example, channel estimation updates are done only when the constellation energy is greater than 42. Given this premise, the following constellation coordinates would give such an energy level:

| $(X_i, X_q)$ | $X_i^2 + X_q^2$ |
|---|---|
| I1, I7 | 50 |
| I3, I7 | 58 |
| I5, I7 | 74 |
| I7, I7 | 98 |
| I5, I5 | 50 |

Figure 6:
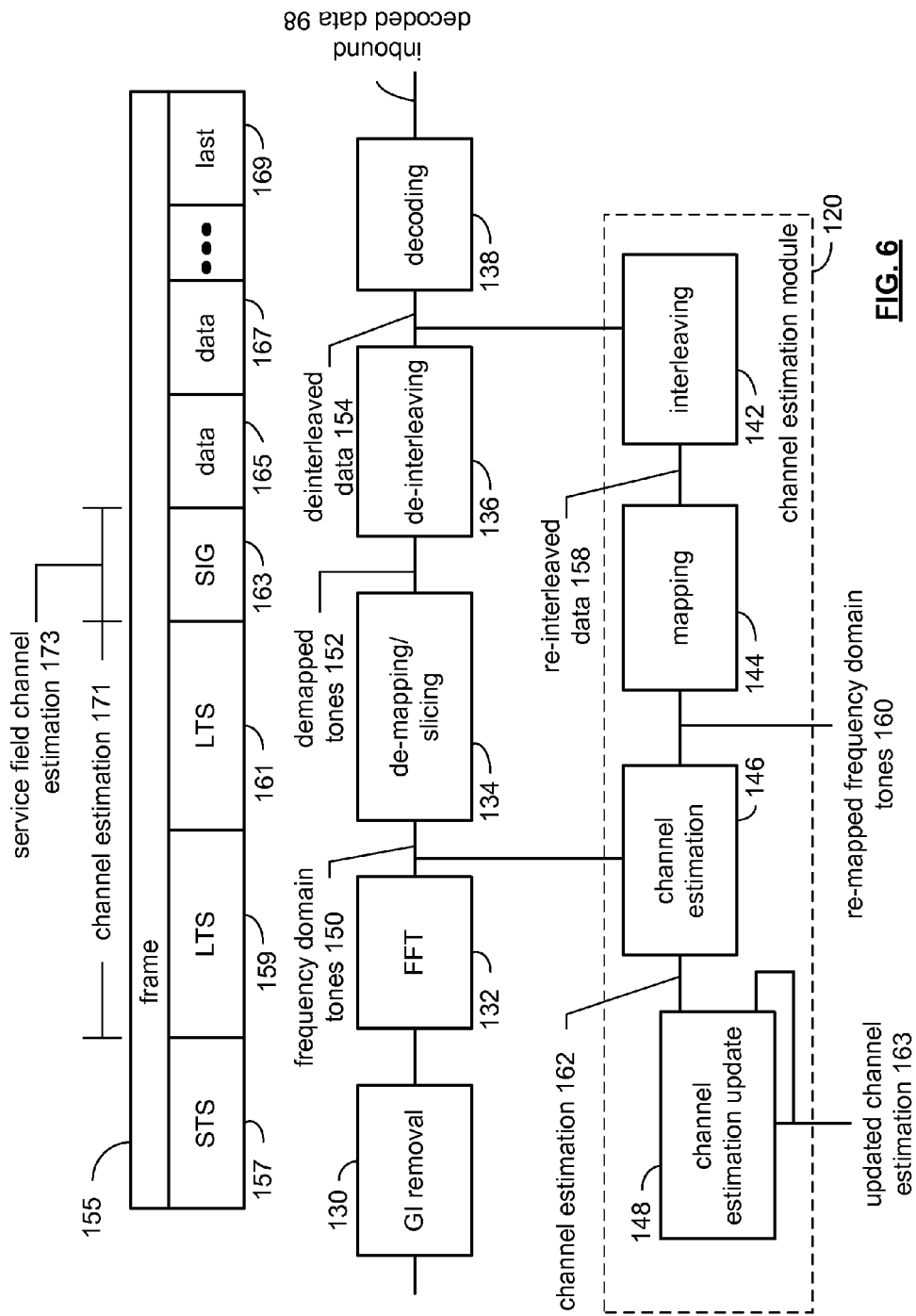
FIG. 6 is a schematic block diagram of another embodiment of the baseband processing module of the wireless communication device of FIG. 3 in accordance with the present invention.

FIG. 6 is an alternate implementation of the baseband processing module 64. In this embodiment the baseband processing module 64 includes the guard interval removal module 130, the FFT module 132, the demapping/slicing module 134, the deinterleaving module 136, the decoding module 138, and the channel estimation module 120. In this embodiment, the channel estimation module 120 includes the interleaving module 142, the mapping module 144, the channel estimation module 146 and the channel estimation update module 148. Modules 130-138 function as previously described with reference to FIG. 5 to convert inbound time domain baseband signals into inbound decoded data 98.

In this embodiment, the channel estimation module 120 receives the deinterleaved data 154 from module 136 via the interleaving module 142. The interleaving module 142 reinterleaves the data to produce reinterleaved data 158. The mapping module 144 maps the reinterleaved data 158 to a plurality of remapped frequency domain tones 160. The channel estimation module 146 and channel estimation update module 148 function as previously described with reference to FIG. 5 to produce the updated channel estimate 163.

Figure 7:
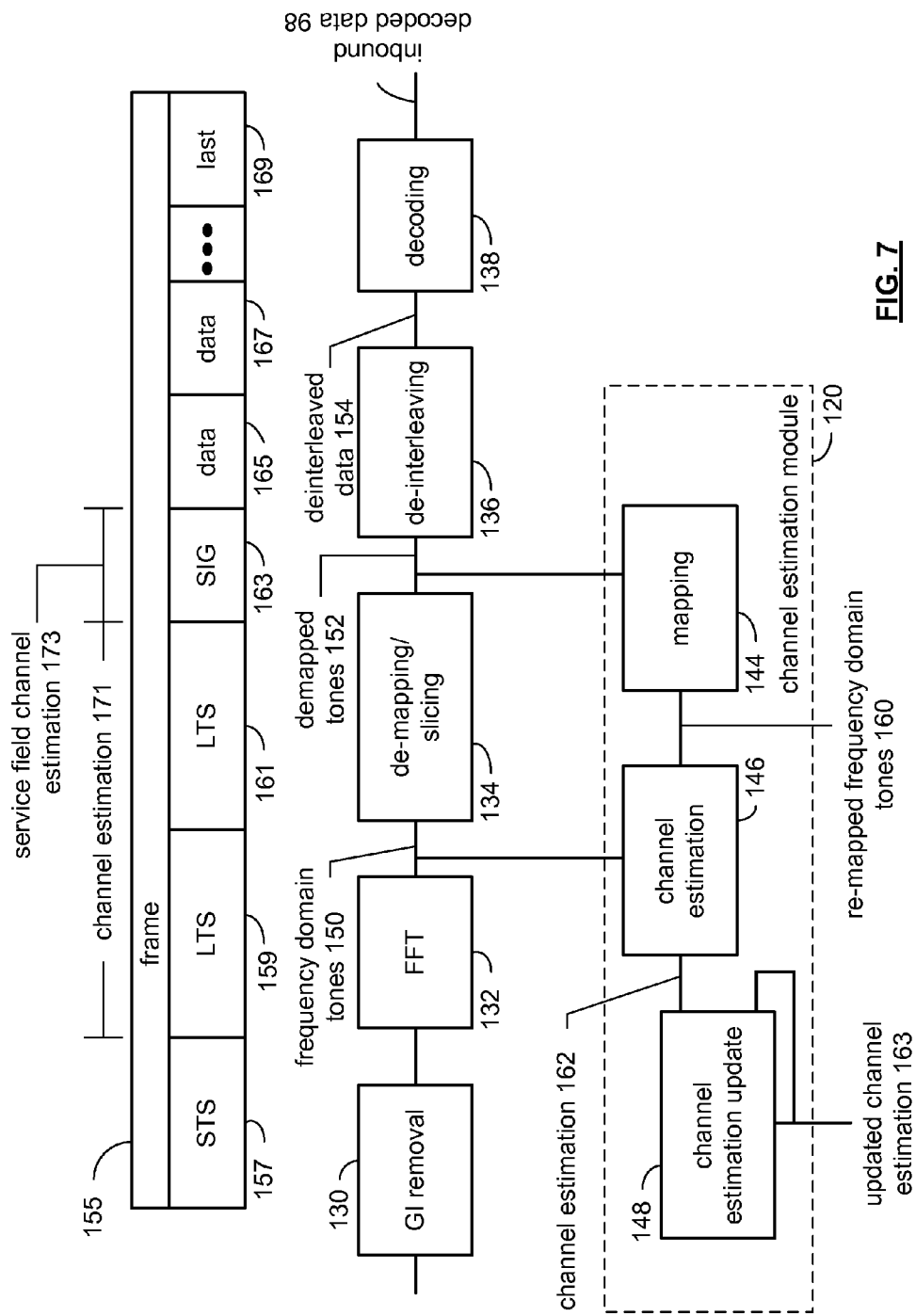
FIG. 7 is a schematic block diagram of yet another embodiment of the baseband processing module of the wireless communication device of FIG. 3 in accordance with the present invention.

FIG. 7 is a schematic block diagram of yet another embodiment of the baseband processing module 64. In this embodiment, the baseband processing module 64 is configured to include the guard interval removal module 130, the FFT module 132, the demapping/slicing module 134, the deinterleaving module 136, the decoded module 138, and the channel estimation module 120. In this embodiment, the channel estimation module 120 includes the mapping module 144, the channel estimation module 146 and the channel estimation update module 148. Modules 130-138 operate as previously described with reference to FIG. 5 to convert inbound time domain baseband signals into inbound decoded data 98.

In this embodiment, the channel estimation module 120 receives the demapped tones 152 via the mapping module 144. The mapping module 144 maps the demapped tones 152 to tones of the OFDM modulation to produce a plurality of remapped frequency domain tones 160. The channel estimation module 146 and channel estimation update module 148 function as previously described with reference to FIG. 5 to produce the updated channel estimation 163.

Figure 8:
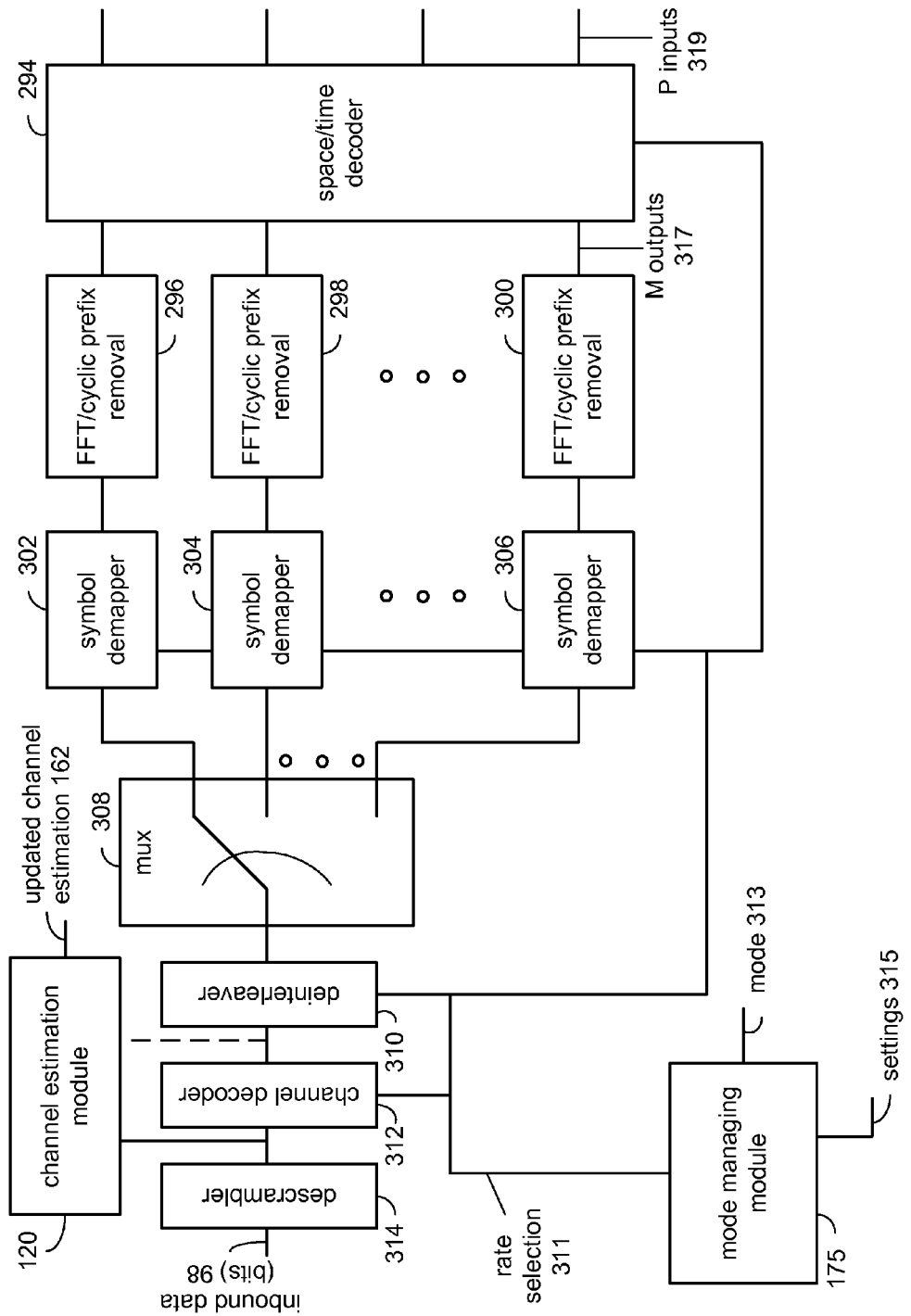
FIG. 8 is a schematic block diagram of an embodiment of the baseband processing module of the wireless communication device of FIG. 2 in accordance with the present invention.

FIG. 8 illustrates the baseband processing of a receiver in accordance with the wireless communication device of FIG. 2. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, a descramble module 314, and the channel estimation module 120. The baseband processing module may further include a mode managing module 175, which produces settings 315 and rate selections 311 based on mode of operation inputs 313. The space/time decoding module 294 receives P-inputs from the receiver paths and produces M-output paths. In an embodiment, the space/time decoding module 294 multiples the input symbols of each path with a decoding matrix that has the form of $$\begin{bmatrix} C_1 & C_2 & C_3 & \cdots & C_{2M-1} \\ -C_2^* & C_1^* & C_4 & \cdots & C_{2M} \end{bmatrix}$$

Note that the rows of the decoding matrix correspond to the number of input paths and the columns correspond to the number of output paths. Note that the number of M output paths of the space and time decoding may equal the number of P-input paths of the space and time decoding or the number of input paths P may equal M+1 paths.

The FFT/cyclic prefix removal modules 296-300 converts the M streams of symbols from time domain symbols to frequency domain symbols to produce M streams of frequency domain symbols. In one embodiment, the prefix removal function removals inter-symbol interference based on a prefix. Note that, in general, a 64-point FFT will be used for 20 MHz channels and 128-point FFT will be used for 40 MHz channels.

The symbol demapping modules 302-306 convert the frequency domain symbols into bit streams of data. In an embodiment, each symbol demapping module maps quadrature amplitude modulated QAM symbols (e.g., BPSK, QPSK, 16 QAM, 64 QAM, 256 QAM, et cetera) into a bit stream of data. Note that for IEEE 802.11(a) backward compatibility, double gray coding may be used. The multiplexer 308 combines the demapped symbol streams into a single path. The deinterleaver 310 deinterleaves the single path.

The iterative decoder 312, which is described in greater detail in co-pending patent application entitled WLAN RECEIVER HAVING AN ITERATIVE DECODER having a U.S. Provisional Application No. 60/546,051 and a provisional filing date of Feb. 19, 2004, decodes the deinterleaved data to produce decoded data. The descrambler 314 descrambles the decoded data to produce the inbound data 98. In one embodiment, the descrambler 314 removes (in GF2) a pseudo random sequence from the decoded data. A pseudo random sequence may be generated from a feedback shift register with the generator polynomial of $S(x)=x^7+x^4+1$ to produce scrambled data.

The channel estimation module 120 may be coupled to the output of the deinterleaving module 310 to receive deinterleaved data or it may be coupled to the output of the channel decoder 312 to receive decoded data. If the channel estimation module 120 is coupled to receive the decoded data it functions as previously described with reference to FIG. 5. If the channel estimation module 120 receives the deinterleaved data, it functions as previously described with reference to FIG. 6.

Figure 9:
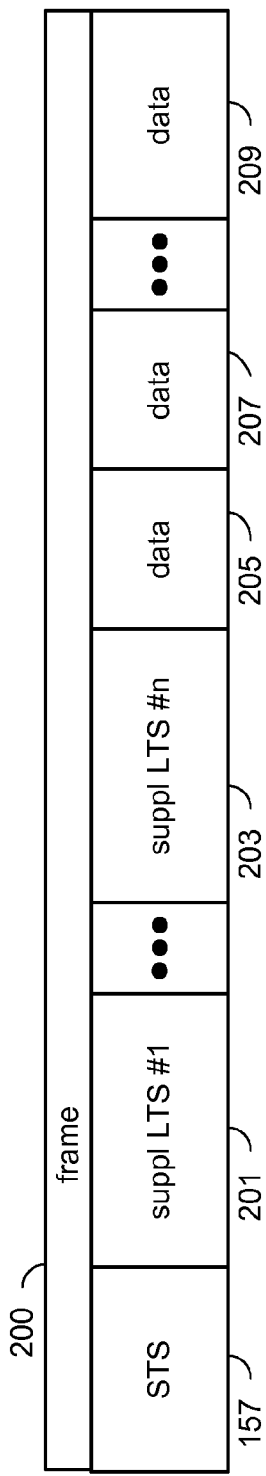
FIGS. 9-11 are diagrams of various frame formats that may be processed by the baseband processing module of FIG. 8.

FIG. 9 illustrates a frame 200 that may be constructed in accordance with IEEE 802.11n when only 802.11n compliant devices are within a proximal area for a wireless communication. As shown, frame 200 includes a short training sequence (STS) 157, a plurality of supplemental long training sequences (suppl LTS) 201-203, and a plurality of data payload sections 205-207. For this type of frame, the channel estimation module 120 of FIG. 8 will initially generate the channel estimation based on the LTS channel estimation as previously described with reference to FIG. 5. The channel estimation module 120 will then update the channel estimation for each channel estimation it generates for a data payload section. As shown, the 1$^{st}$ data payload has a corresponding channel estimate that is used to update the LTS channel estimate to produce the updated channel estimate. The next data payload has a corresponding channel estimate produced for it and the corresponding channel estimate is used to update the previously updated channel estimate.

Figure 10:
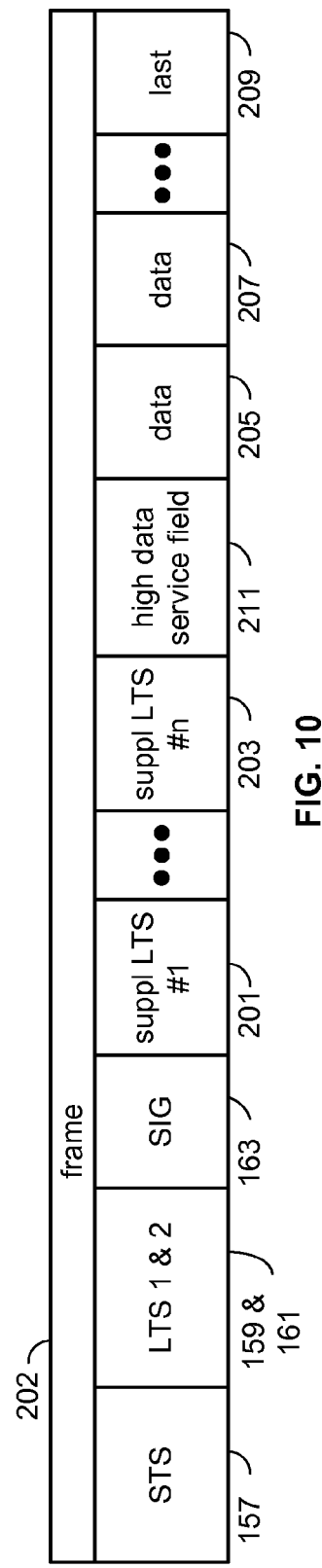

FIG. 10 illustrates a frame 202 that may be in accordance with IEEE 802.11n where the communication area includes 802.11n, 802.11a and/or 802.11g devices. In this instance, the frame 202 includes the short training sequence (STS) 157, long training sequences (LTS) 159 & 161 in accordance with the 802.11a and/or 802.11g standard, a service field (SIG) 163 in accordance with the 802.11a and/or 802.11g standard, supplemental long training sequences (suppl LTS) 201-203, a high data service field 211, and a plurality of data payload sections 205-209. Frame 202, as illustrated, includes two frame information fields: the service field 163 and the high data service field 211.

The channel estimation module 120 of FIG. 8 generates the channel estimation by first determining the LTS channel estimation and then updating it with a channel estimation corresponding to the service field. The channel estimation module then determines a channel estimate for the supplemental long training sequences and uses that to update the previously updated channel estimate. The updating of the channel estimate continues for the high data service field 211 and one or more of the data payload fields 205-209.

Figure 11:
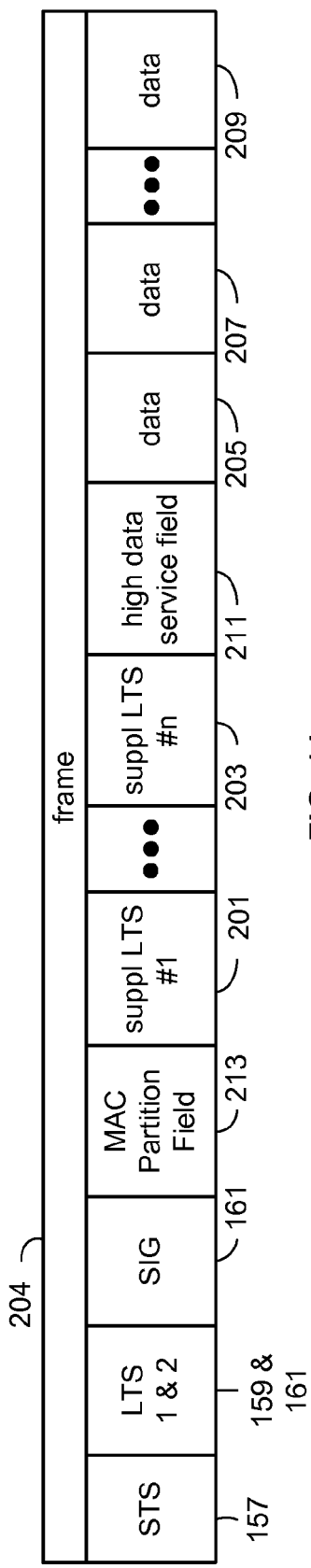

FIG. 11 is another illustration of a frame 204 that may be compliant with IEEE 802.11n for communications that include 802.11n devices, 802.11a devices, 802.11b devices and/or 802.11g devices. In this example, the frame 204 includes a short training sequence (STS) 157, the legacy long training sequences 1 and 2 (LTS) 159 & 161, the legacy service field (SIG) 163, a MAC partitioning field 213, supplemental long training sequences (suppl LTS) 201-203, the high data service field 211 and a plurality of data payload fields 205-209. The channel estimation module 120 of FIG. 8 determines the initial channel estimate by utilizing the LTS channel estimate. The channel estimation module 120 then determines a channel estimate for each field and/or section of frame 204 and uses that channel estimate to update the previously updated channel estimate. In this illustration, frame 204 includes the legacy service field 163, the MAC partitioning field 213 and the high data service field 211 as frame information sections.

Figure 12A:
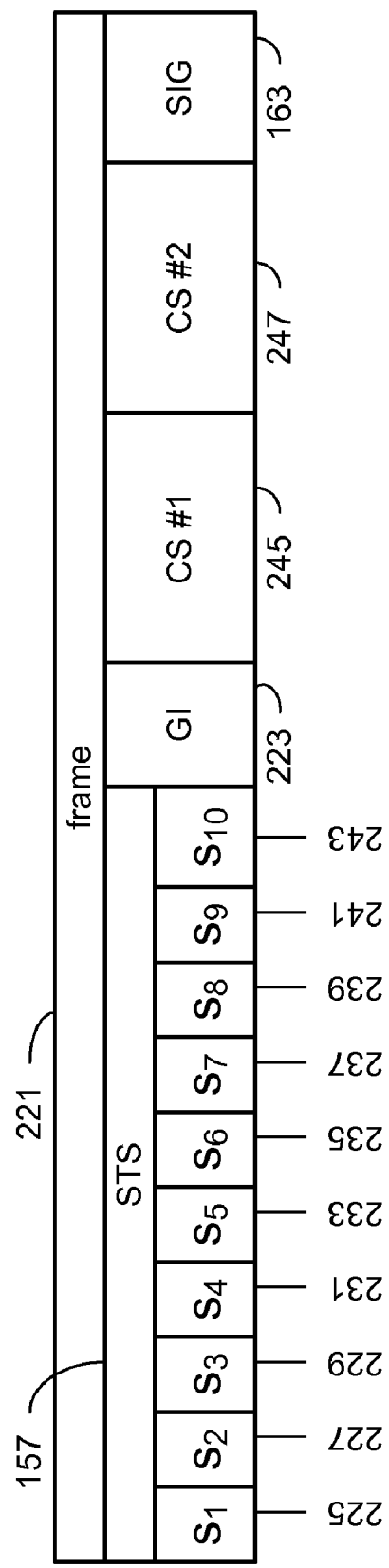
FIG. 12A is a diagram of a frame format that may be processed by the baseband processing modules of FIGS. 7 and 8.

FIG. 12A is a diagram of a portion of a frame 221 that may be processed by the baseband processing modules of FIGS. 7 and 8. The frame 221 includes a short training sequence (STS) 157, a guard interval (GI) 223, two channel soundings (CS) 245 and 247, and a signal field (SIG) 163. In one embodiment, the portion of the frame 221 is 20 microseconds (µS) in duration where the STS consumes 4 µS, the GI consumes 1.6 µS, each of the CSs consumes 3.2 µS, and the signal field consumes 4 µS. Within the STS, each of the symbols consumes 0.8 µS.

The STS 157 includes ten short training symbols ($s_1$-$s_{10}$) 225-243. The channel soundings 245 and 247 (e.g., long training in IEEE 802.11a) of the frame 221 satisfy 2 criteria:

1. Legacy (802.11a/g) stations can use it to decode the SIGNAL field and get the frame length to set the clear channel assessment (CCA) indication.
2. Next generation 802.11n stations can use it for (part of) the MIMO channel estimate.

With these criteria satisfied, the channel estimation error is minimized for a given amount of overhead and the sequence is energy-efficient. For unchanged SIGNAL field decoding at legacy stations, linear weighting of the existing long training and SIGNAL symbols at the transmitter antenna inputs is used, where the same weighting is applied to the first two long training symbols and the legacy SIGNAL field for decoding by legacy stations.

Figure 12B:
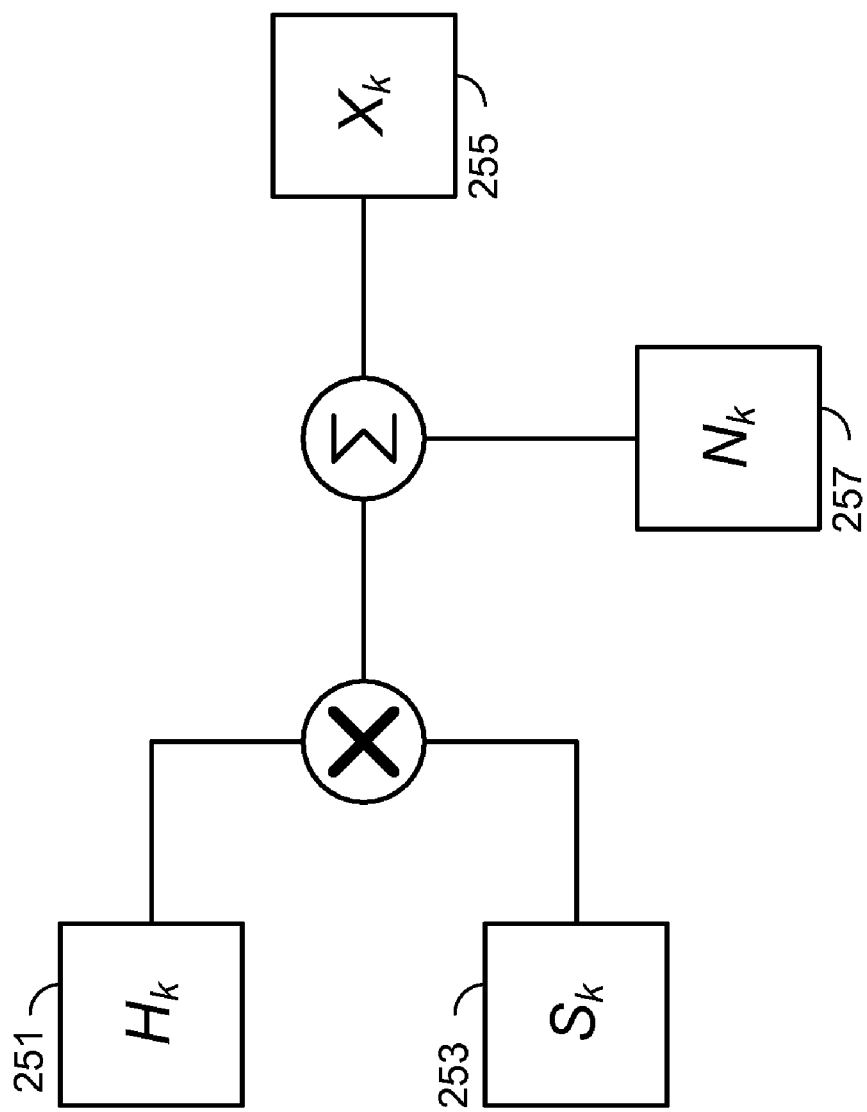
FIG. 12B is a received signal model of the signal of the frame format of FIG. 12A.

FIG. 12B is a diagram of a received signal model of the signal of the frame format of FIG. 12A. As shown the received signal ($X_k$) 255 is comprises of the transmitted channel sounding signal ($S_k$) 253, a channel estimate ($H_k$) 251, and a noise matrix ($N_k$) 257. In particular, the received signal $X_k = S_k * H_k + N_k$, where $S_k$, $H_k$, and $N_k$ are matrixes. In one embodiment, the channel estimate $H_k$ 251 and the transmitted channel sounding signal $S_k$ 253 may be in the form of:

$$X_k = S_k \cdot H_k + N_k$$

$$H_k = \begin{pmatrix} h_k^{(0,0)} & h_k^{(0,1)} & \cdots & h_k^{(0,N-1)} \\ h_k^{(1,0)} & h_k^{(1,1)} & \cdots & h_k^{(1,N-1)} \\ \vdots & \vdots & \ddots & \vdots \\ h_k^{(M-1,0)} & h_k^{(M-1,1)} & \cdots & h_k^{(M-1,N-1)} \end{pmatrix}$$

$$S_k = \begin{pmatrix} s_k^{(0,0)} & s_k^{(0,1)} & \cdots & s_k^{(0,M-1)} \\ s_k^{(1,0)} & s_k^{(1,1)} & \cdots & s_k^{(1,M-1)} \\ \vdots & \vdots & \ddots & \vdots \\ s_k^{(L-1,0)} & s_k^{(L-1,1)} & \cdots & s_k^{(L-1,M-1)} \end{pmatrix}$$

From this signal model, the zero-forcing (ZF) MIMO channel estimate is then computed as:

$$\hat{H}_k = (S_k^H \cdot S_k)^{-1} \cdot S_k^H \cdot X_k = \frac{1}{M} \cdot S_k^H \cdot X_k$$

If the long training symbol sequence is defined well, $S_k$ ends up being a real scalar times a unitary matrix). In such case, the minimum mean-square (MMSE) channel estimate is computed as:

$$\hat{H}_k = (S_k^H \cdot S_k + \sigma_\eta^2 \cdot I)^{-1} \cdot S_k^H \cdot X_k = \rho \cdot S_k^H \cdot X_k$$

$$\rho = \frac{1}{M + \sigma_\eta^2}$$

where, for simplicity, $n_k$ is assumed to be individually identically distributed (i.i.d.) Gaussian and chosen to make a "good long training choice." Note that there is essentially no reason to perform MMSE vs. Zero Forcing (ZF) estimation for the sequences since we have S is carefully chosen.

Figure 13:
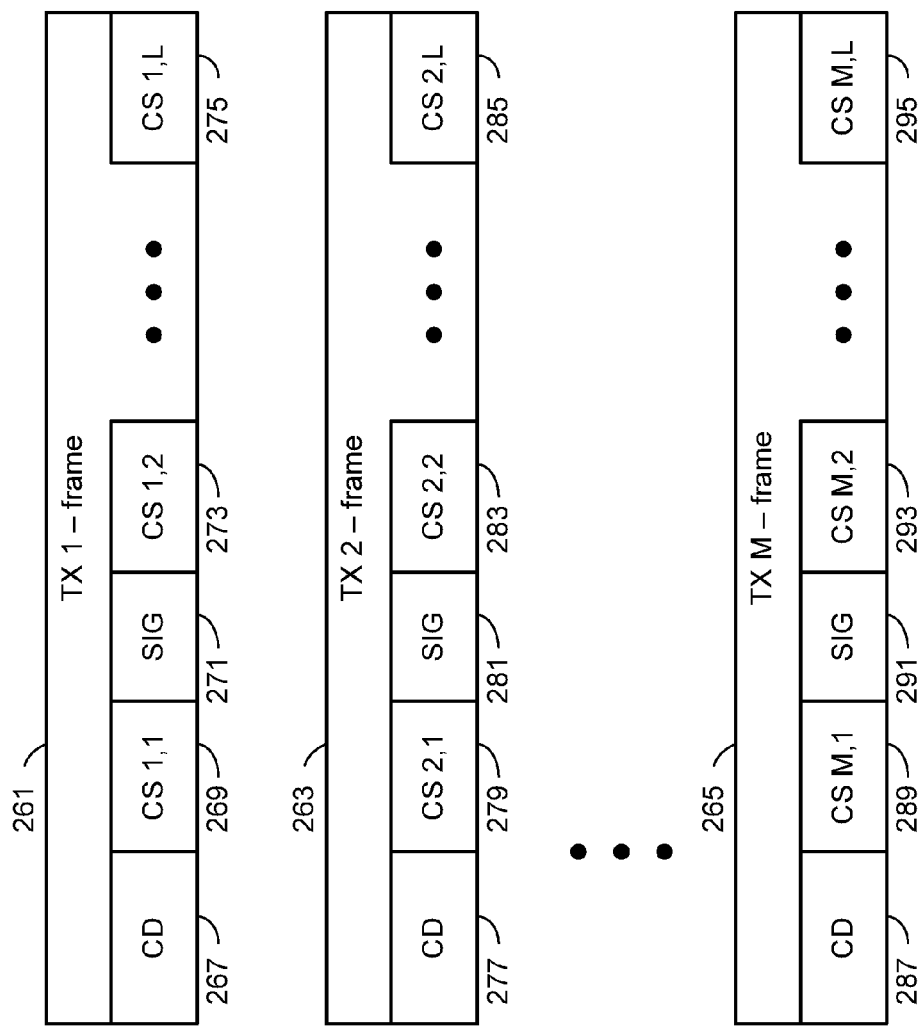
FIG. 13 is a diagram illustrating the transmission of a preamble on a plurality of antennas that is compatible with the baseband processing modules of both FIGS. 7 and 8.

FIG. 13 is a diagram illustrating the transmission of a plurality of preambles 261-265 on a plurality of antennas (TX 1 through TX M) that is compatible with the baseband processing modules of both FIGS. 7 and 8. In one embodiment, each preamble 261-265 includes a carrier detect (CD) field 267, 277, 287, a first channel sounding (CS M,1) 269, 279, and 289, a signal field (SIG) 271, 281, 291, and L-1 remaining channel soundings (CS M,L). In such an embodiment, the channel detect CD 267, 277, 287, the first channel soundings 269, 279, 289, and the signal field 271, 281, 291 may correspond to a short training sequence, a long training sequence, and a signal field of a legacy wireless protocol (e.g., IEEE 802.11a, b, and/or g).

According to this teaching of the present invention, preamble energy is transmitted from an IEEE 802.11n STA or AP on all tones, or nearly all of the tones, on all antennas, or nearly all of the antennas, for all L sounding sequences. The energy sent from each of M antennas during each of L soundings is $2s^2/M$ when L=M. The total energy for matrix channel estimation is $2Ms^2$ when L=M. Thus, the transmitted energy is M times more energy sent than when only a single tone is transmitted at any time.

Figure 14:
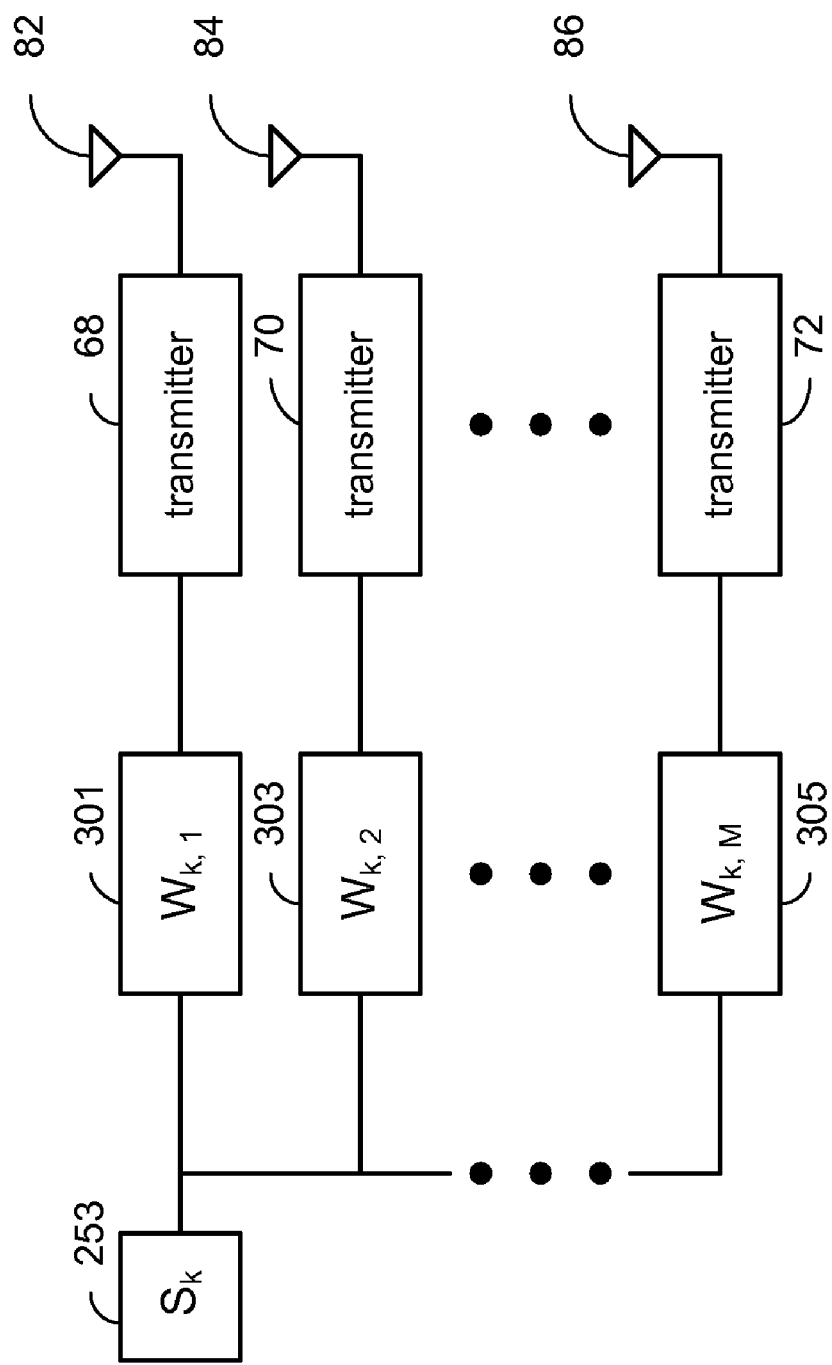
FIG. 14 is a diagram illustrating a transmission model of the frame format of FIG. 12A.

FIG. 14 is a diagram illustrating a transmission model of the frame format of FIG. 12A. For this transmission format, in order to satisfy backwards compatibility issues and also to satisfy the requirements of the next generation channel estimation requirements, W is chosen such that W and $W^{-1}$ are simple to implement. Further, any beam forming issues from MIMO transmitters (next generation devices) by $[w_{11} \ldots w_{1M}]$ should be well-received by legacy 802.11a/g devices.

In this embodiment, a channel sounding ($S_k$) 253 is multiplied by a plurality of weighting factors ($W_{k,m}$) 68-72, wherein k corresponds to the channel sounding number, which ranges from 1 to 1, and m corresponds to the number of transmit antennas 82-86. The resulting weighted channel soundings are converted to RF signals via the transmitters 68-72 and subsequently transmitted via the antennas 82-86. In such an embodiment, a weighting factor matrix may be as follows:

$$\begin{bmatrix} w_{11} & w_{12} & \cdots & w_{1M} \\ w_{21} & w_{22} & \cdots & w_{2M} \\ \vdots & \vdots & \ddots & \vdots \\ w_{L1} & w_{L2} & \cdots & w_{LM} \end{bmatrix} S_k$$

With transmissions occurring on all antennas at all times, nulls may be formed. The nulls may be compensated for by selecting a weight sequence that acts as a beam former such that the nulls are steered in particular directions. For example, for the case of the vector $w_1 = [1\ 1]$ (one row of the previous slide's W matrix for a 2 TX case), nulls would be steered in the directions -90° and +90°. Thus, certain directions are disadvantaged vs. others at a single-input receiver of a legacy WLAN device.

According to the present invention, a different complex weight is applied to each subcarrier on M-1 of the transmit antennas. This forms a different beam pattern on each subcarrier and results in less power and capacity loss in the worst directions.

Figure 15:
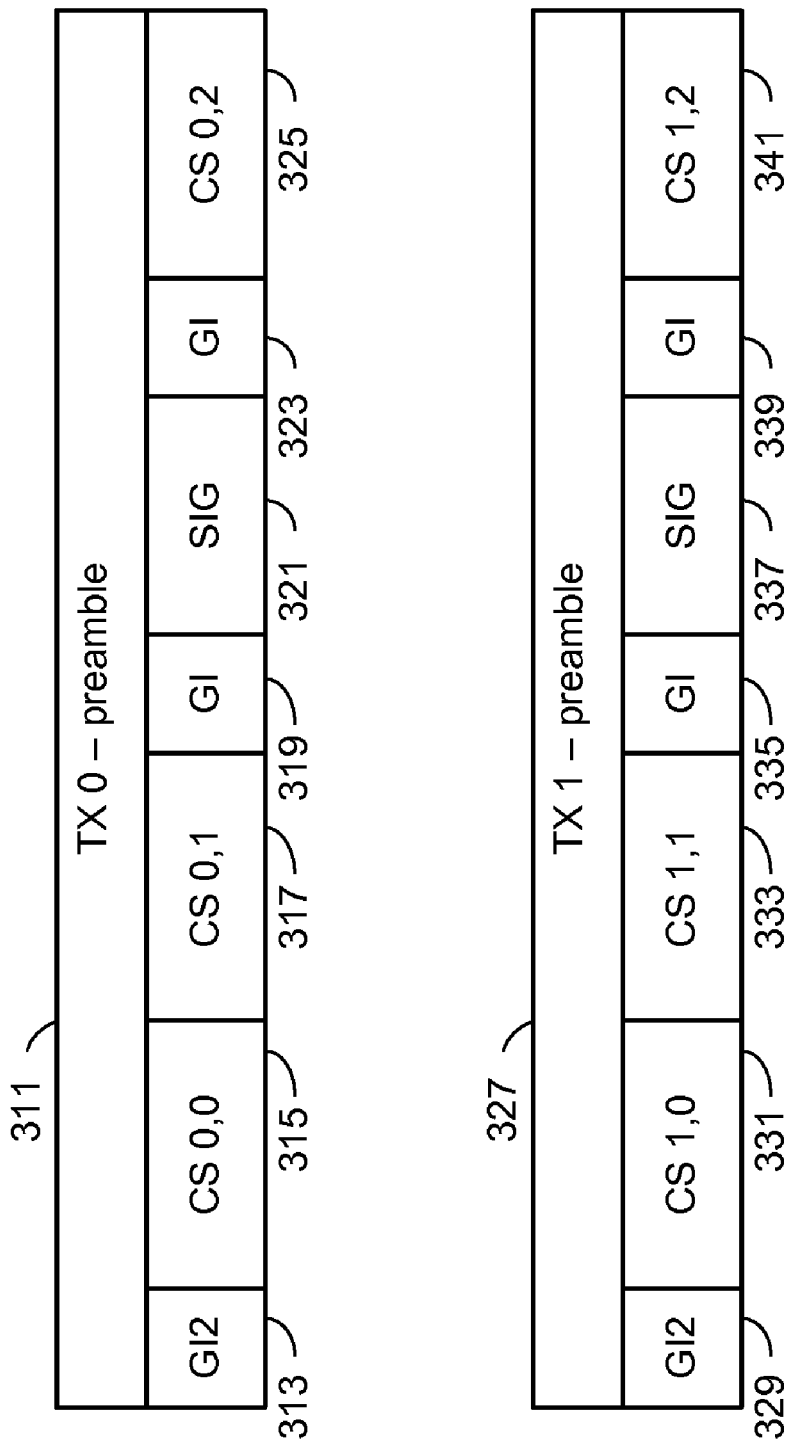
FIG. 15 is a diagram illustrating the manner in which a preamble of the frame format of FIG. 12A is formed for a generalized next generation MIMO transmitter and particularly for a two antenna next generation MIMO transmitter.

FIG. 15 is a diagram illustrating the manner in which a preamble of the frame format of FIG. 12A is formed for a generalized next generation MIMO transmitter and particularly for a two antenna next generation MIMO transmitter. In this illustration, two preambles are generated: one for each active antenna. The first preamble 311, which is transmitted by the first antenna, includes a double guard interval (GI2) 313, a first channel sounding (CS 0,0) 315, a second channel sounding (CS 0,1) 317, a guard interval (GI) 319, a signal field (SIG) 321, another guard interval (GI) 323, and a third channel sounding (CS 0,2) 325. The second preamble 327, which is transmitted by the second antenna, includes a double guard interval (GI2) 329, a first channel sounding (CS 1,0) 331, a second channel sounding (CS 1,1) 333, a guard interval (GI) 335, a signal field (SIG) 337, another guard interval (GI) 339, and a third channel sounding (CS 1,2) 341.

In this embodiment, the following may be used for the various channel soundings:

$$s_{01} = s_{00}$$

$$s_{10,k} = -s_{00,k} \cdot e^{i \cdot \theta_k}$$

$$s_{11} = s_{10}$$

$$s_{02} = s_{00}$$

$$s_{12,k} = s_{00,k} \cdot e^{i \cdot \theta_k}$$

From these channel soundings, the weighting factor may be applied as follows:

$$S_k = \begin{bmatrix} s_{10,k} & s_{11,k} \\ s_{20,k} & s_{21,k} \end{bmatrix} = s_{00,k} \cdot \begin{bmatrix} 1 & -1 \\ 1 & 1 \end{bmatrix} \cdot \begin{bmatrix} 1 & 0 \\ 0 & e^{i \cdot \theta_k} \end{bmatrix} = \begin{bmatrix} s_{00,k} & -s_{00,k} \cdot e^{i \cdot \theta_k} \\ s_{00,k} & s_{00,k} \cdot e^{i \cdot \theta_k} \end{bmatrix}$$

where the first digital of the subscript of a channel sounding corresponds to the number of antennas, the second digit corresponds to the number of symbols, and the k corresponds to the number of channel soundings. For example, $S_{10,k}$ corresponds to the first symbol transmitted on the first antenna for the kth channel sounding.

To obtain a different beam pattern for each subcarrier, the following is applied:

$$\theta_k = \pi \cdot k / 6, k = -\frac{N_{subcarriers}}{2} \ldots \frac{N_{subcarriers}}{2}$$

Figure 16:
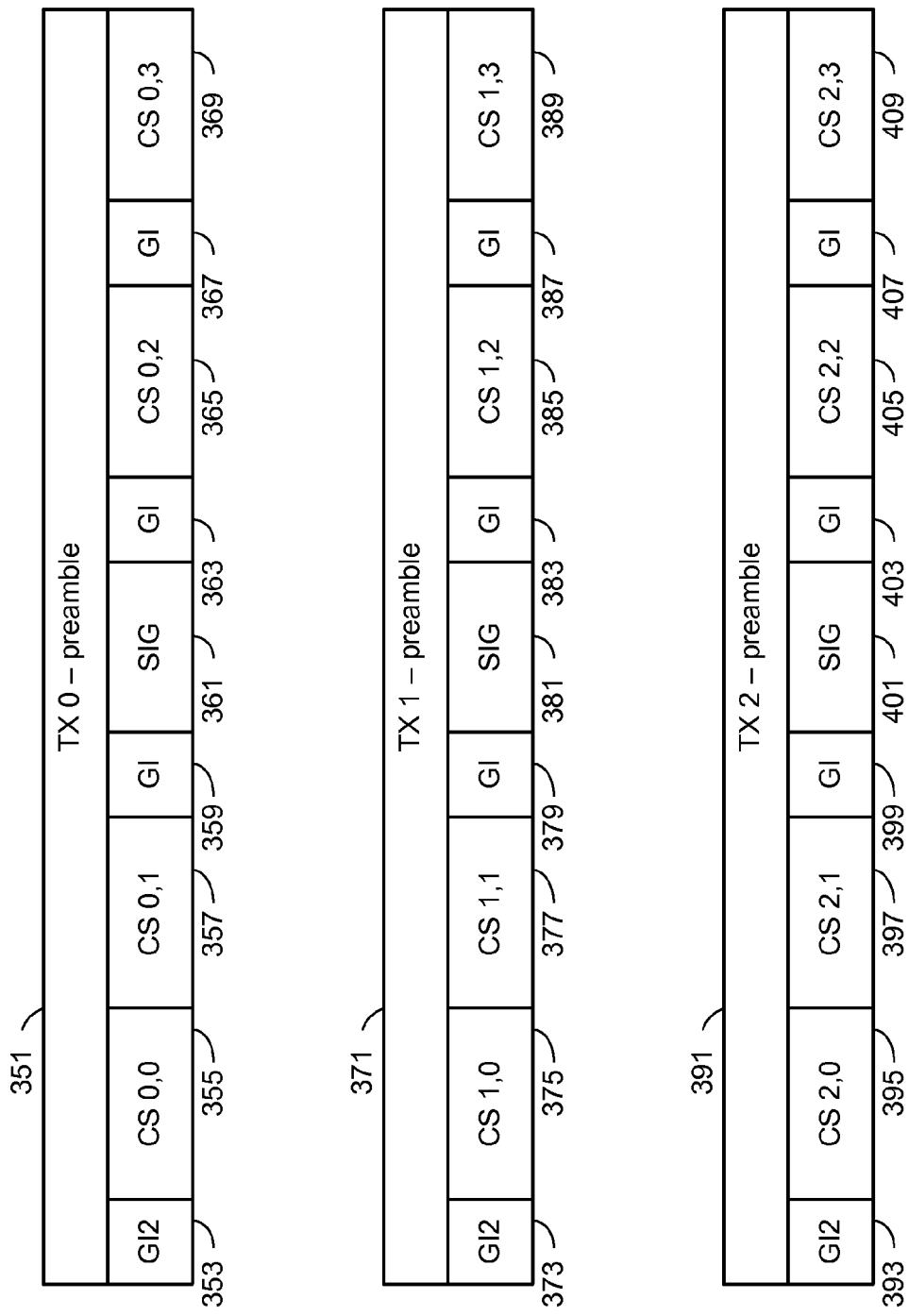
FIG. 16 is a diagram illustrating the manner in which a preamble of the frame format of FIG. 12A is formed for a three antenna next generation MIMO transmitter.

FIG. 16 is a diagram illustrating the manner in which a preamble of the frame format of FIG. 12A is formed for a three antenna next generation MIMO transmitter. In this illustration, three preambles are generated: one for each active antenna. The first preamble 351, which is transmitted by the first antenna, includes a double guard interval (GI2) 353, a first channel sounding (CS 0,0) 355, a second channel sounding (CS 0,1) 357, a guard interval (GI) 359, a signal field (SIG) 361, another guard interval (GI) 363, a third channel sounding (CS 0,2) 365, a third guard interval (GI) 367, and a fourth channel sounding (CS 0,3) 369. The second preamble 371, which is transmitted by the second antenna, includes a double guard interval (GI2) 373, a first channel sounding (CS 1,0) 375, a second channel sounding (CS 1,1) 377, a guard interval (GI) 379, a signal field (SIG) 381, another guard interval (GI) 383, a third channel sounding (CS 1,2) 385, a third guard interval (GI) 387, and a fourth channel sounding (CS 1,3) 389. The third preamble 391, which is transmitted by the third antenna, includes a double guard interval (GI2) 393, a first channel sounding (CS 2,0) 395, a second channel sounding (CS 2,1) 397, a guard interval (GI) 399, a signal field (SIG) 401, another guard interval (GI) 403, a third channel sounding (CS 2,2) 405, a third guard interval (GI) 407, and a fourth channel sounding (CS 2,3) 409.

For the various channel soundings, the weighting factor matrix may be applied as follows:

$$S_k = \begin{bmatrix} s_{10,k} & s_{11,k} & s_{12,k} \\ s_{20,k} & s_{21,k} & s_{22,k} \\ s_{30,k} & s_{31,k} & s_{32,k} \end{bmatrix} = \begin{bmatrix} s_{00,k} & s_{00,k} \cdot e^{i\theta_k} & s_{00,k} \cdot e^{i\phi_k} \\ s_{00,k} & s_{00,k} \cdot e^{i(\theta_k - \frac{4\pi}{3})} & s_{00,k} \cdot e^{i(\phi_k - \frac{2\pi}{3})} \\ s_{00,k} & s_{00,k} \cdot e^{i(\theta_k - \frac{2\pi}{3})} & s_{00,k} \cdot e^{i(\phi_k - \frac{4\pi}{3})} \end{bmatrix}$$

To obtain a different beam pattern for each subcarrier, the following is applied:

$$\theta_k = \pi \cdot k/6$$

$$\phi_k = \pi \cdot (k+4)/6$$

Figure 17:
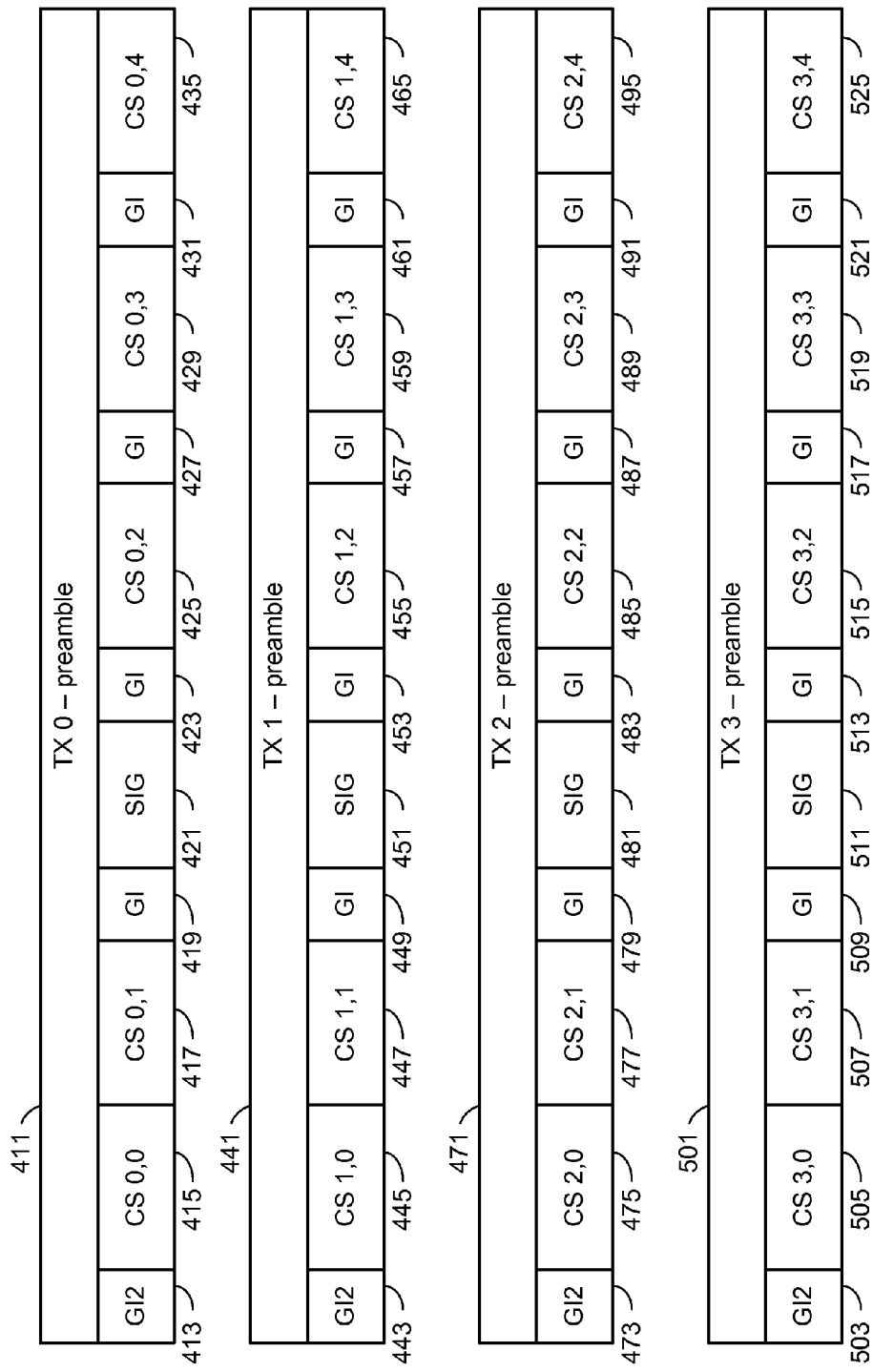
FIG. 17 is a diagram illustrating the manner in which a preamble of the frame format of FIG. 12A is formed for a four antenna next generation MIMO transmitter.

FIG. 17 is a diagram illustrating the manner in which a preamble of the frame format of FIG. 12A is formed for a four antenna next generation MIMO transmitter. In this illustration, four preambles are generated: one for each active antenna. The first preamble 411, which is transmitted by the first antenna, includes a double guard interval (GI2) 413, a first channel sounding (CS 0,0) 415, a second channel sounding (CS 0,1) 417, a guard interval (GI) 419, a signal field (SIG) 421, another guard interval (GI) 423, a third channel sounding (CS 0,2) 425, a third guard interval (GI) 427, a fourth channel sounding (CS 0,3) 429, a guard interval (GI) 431, and a fifth channel sounding (CS 0,4) 435. The second preamble 441, which is transmitted by the second antenna, includes a double guard interval (GI2) 443, a first channel sounding (CS 1,0) 445, a second channel sounding (CS 1,1) 447, a guard interval (GI) 449, a signal field (SIG) 451, another guard interval (GI) 453, a third channel sounding (CS 1,2) 455, a third guard interval (GI) 457, a fourth channel sounding (CS 1,3) 459, a guard interval (GI) 461, and a fifth channel sounding (CS 1,4) 465. The third preamble 471, which is transmitted by the third antenna, includes a double guard interval (GI2) 473, a first channel sounding (CS 2,0) 475, a second channel sounding (CS 2,1) 477, a guard interval (GI) 479, a signal field (SIG) 481, another guard interval (GI) 483, a third channel sounding (CS 2,2) 485, a third guard interval (GI) 487, a fourth channel sounding (CS 2,3) 489, a guard interval (GI) 491, and a fifth channel sounding (CS 2,4) 495. The fourth preamble 501, which is transmitted by the fourth antenna, includes a double guard interval (GI2) 503, a first channel sounding (CS 3,0) 505, a second channel sounding (CS 3,1) 507, a guard interval (GI) 509, a signal field (SIG) 511, another guard interval (GI) 513, a third channel sounding (CS 3,2) 515, a third guard interval (GI) 517, a fourth channel sounding (CS 3,3) 519, a guard interval (GI) 521, and a fifth channel sounding (CS 3,4) 525.

For the embodiment of FIG. 17, $$\theta_k = \pi \cdot k/6$$

$$\phi_k = \pi \cdot (k+2)/6$$

$$\psi_k = \pi \cdot (k+4)/6$$

With the operations of FIGS. 15-17, $\theta_k$, $\phi_k$, and $\psi_k$ are set to form a different beam pattern on each subcarrier. Because more energy is transmitted, better channel estimates may be determined by next generation 802.11n devices. Further, with this signal format, simple Zero Forcing (ZF) or MMSE channel estimation may be performed by the next generation receivers.

Such channel estimation operations may be performed by applying the following matrices for the two antenna, three antenna, and four antenna cases, respectively.

$$W_T = \begin{bmatrix} +1 & -1 \\ +1 & +1 \end{bmatrix} \Rightarrow W_T^{-1} = \frac{1}{2}\begin{bmatrix} +1 & +1 \\ -1 & +1 \end{bmatrix}$$

$$W_T = \begin{pmatrix} 1 & 1 & 1 \\ 1 & \frac{-1-i\cdot\sqrt{3}}{2} & \frac{-1+i\cdot\sqrt{3}}{2} \\ 1 & \frac{-1+i\cdot\sqrt{3}}{2} & \frac{-1-i\cdot\sqrt{3}}{2} \end{pmatrix} \Rightarrow W_T^{-1} =$$

$$\frac{1}{3} \cdot \begin{pmatrix} 1 & 1 & 1 \\ 1 & \frac{-1-i\cdot\sqrt{3}}{2} & \frac{-1+i\cdot\sqrt{3}}{2} \\ 1 & \frac{-1+i\cdot\sqrt{3}}{2} & \frac{-1-i\cdot\sqrt{3}}{2} \end{pmatrix}$$

$$W_T = \begin{bmatrix} -1 & +1 & +1 & +1 \\ +1 & -1 & +1 & +1 \\ +1 & +1 & -1 & +1 \\ +1 & +1 & +1 & -1 \end{bmatrix} \Rightarrow W_T^{-1} = \frac{1}{4}\begin{bmatrix} -1 & +1 & +1 & +1 \\ +1 & -1 & +1 & +1 \\ +1 & +1 & -1 & +1 \\ +1 & +1 & +1 & -1 \end{bmatrix}$$

Using these techniques, in a first embodiment, the channel may be estimated with prior knowledge of the per-subcarrier beamforming coefficients and then these coefficients do not need to be applied to the remaining transmitted symbols. This embodiment provides the advantage that no extra multiplications are required on the transmitter side, as the LTRN sequence may simply be looked up in a table.

With a second embodiment, the channel may be estimated without knowledge of the per-subcarrier beamforming coefficients. With this embodiment, the coefficients must be applied to the remaining transmitted symbols. An advantage of this embodiment is that the receiver channel estimation is simplified (fewer multiplies), but the transmitter performs additional multiplications.

With the first embodiment, the following equations apply (using earlier notation and L=M:

$$\hat{H}_k = \frac{1}{M} \cdot s_{00,k}^* \cdot W_{B,k}^H \cdot W_T^H \cdot X_k$$

$$W_{B,k} = \text{diag}([\,1\ \ e^{\frac{i\cdot\pi\cdot l_1}{6}}\ \ \ldots\ \ e^{\frac{i\cdot\pi\cdot l_{M-1}}{6}}\,])$$

With the second embodiment, the following equation applies (using earlier notation and L=M:

$$\hat{H}_k = \frac{1}{M} \cdot s_{00,k}^* \cdot W_T^H \cdot X_k$$

Further refinement of the channel estimate is possible by duplicating the entire length-M sequence p times. The refinement may be made by simple averaging. The overhead is identical to the single active transmitter method described on slide 10, but the performance is far superior.

For the backward-compatible preamble case, in which the number of long training symbols is M+1, the longer sequence would consist of p*M+1 long training symbols. There are p identical blocks of M symbols, and the first and second symbols on each antenna are identical.

Figure 18:
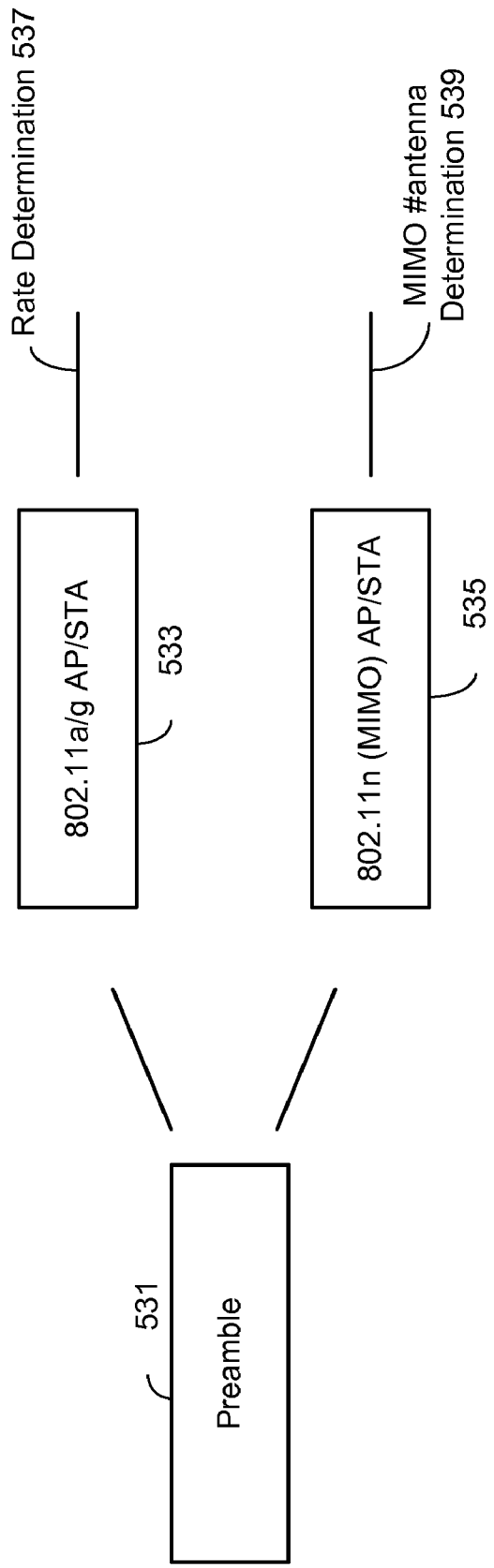
FIG. 18 is a block diagram illustrating the manner in which legacy and next generation WLAN devices interpret information contained in a header of a frame that is backwards compatible.

FIG. 18 is a block diagram illustrating the manner in which legacy and next generation WLAN devices interpret information contained in a header of a frame that is backwards compatible. To reduce receiver computational complexity, the transmit antenna and preamble 531 configuration needs to be encoded in the legacy SIGNAL field 533. The alternative is to have the receiver compute 4 different channel estimates and then select the antenna/preamble configuration 535 that results in a parity bit match and only legal values in the SIGNAL2 (MIMO extensions) field.

According to one aspect of the present invention, if the Reserved bit in the SIGNAL field is set, the Rate bits 537 are re-interpreted using the "MIMO interpretation" 539. For MIMO receivers, with which the rate is determined to be fixed, the Rate bits no longer specify the actual rate. Instead, they specify a dummy rate which, in combination with the length field uniquely identify the length of the frame in symbols and the TX antenna/preamble configuration.

For example, for 54 Mbps, there are 27 possible numbers of bytes in the length field that yield the same frame duration in symbols. These 27 possibilities can encode the TX antenna/preamble configuration. In the following Table 1, three encodings are shown. Note that we may simply be able to use the "6 Mbps" Rate to uniquely specify all lengths and tx antenna/preamble configurations. In this case, the other Rate codes would not be used if the Reserved bit is set. The only disadvantage is that we lose the ability to encode other preamble choices.

TABLE 1

Rate Field Interpretation

| Rate bits | 802.11a interpretation (reserved bit = 0) | MIMO interpretation (reserved bit = 1) |
|---|---|---|
| 1101 | 6 Mbps | length mod 3 = 1 => 2 TX antennas |
|  |  | length mod 3 = 2 => 3 TX antennas |
|  |  | length mod 3 = 3 => 4 TX antennas |
| 1111 | 9 Mbps | N/A |
| 0101 | 12 Mbps | length mod 6 = 1 => 2 TX antennas |
|  |  | length mod 6 = 2 => 3 TX antennas |
|  |  | length mod 6 = 3 => 4 TX antennas |
| 0111 | 18 Mbps | length mod 9 = 1 => 2 TX antennas |
|  |  | length mod 9 = 2 => 3 TX antennas |
|  |  | length mod 9 = 3 => 4 TX antennas |
| 1001 | 24 Mbps | length mod 12 = 1 => 2 TX antennas |
|  |  | length mod 12 = 2 => 3 TX antennas |
|  |  | length mod 12 = 3 => 4 TX antennas |
| 1011 | 36 Mbps | length mod 18 = 1 => 2 TX antennas |
|  |  | length mod 18 = 2 => 3 TX antennas |
|  |  | length mod 18 = 3 => 4 TX antennas |
| 0001 | 48 Mbps | length mod 24 = 1 => 2 TX antennas |
|  |  | length mod 24 = 2 => 3 TX antennas |
|  |  | length mod 24 = 3 => 4 TX antennas |
| 0011 | 54 Mbps | length mod 27 = 1 => 2 TX antennas |
|  |  | length mod 27 = 2 => 3 TX antennas |
|  |  | length mod 27 = 3 => 4 TX antennas |

Figure 19:
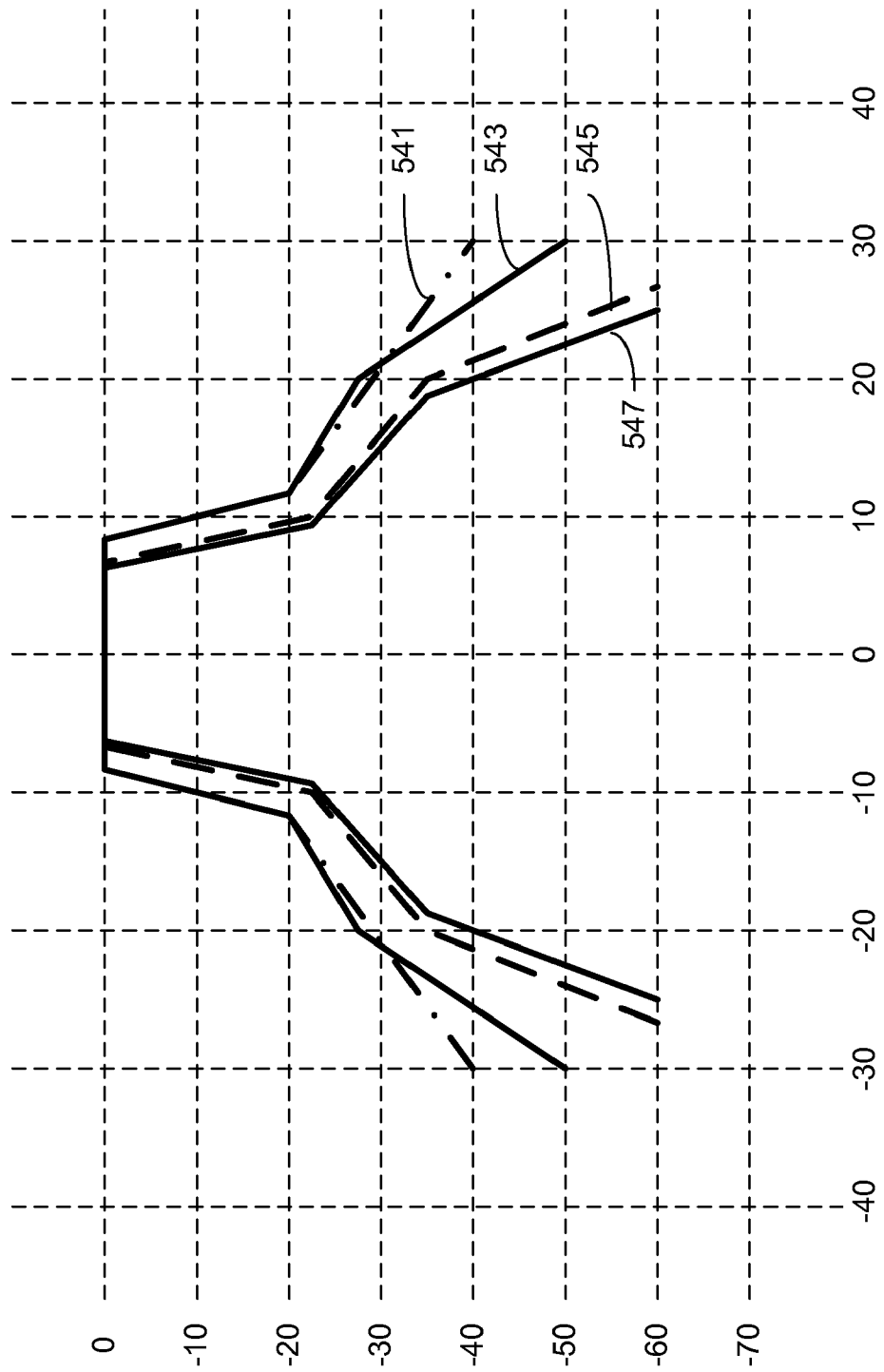
FIG. 19 is a graph illustrating the frequency characteristics of various next generation MIMO signal formats according to the present invention.

FIG. 19 is a graph illustrating the frequency characteristics of various spectral masks of current IEEE 802.11a, b, and g masks 541 and a plurality of next generation MIMO signal masks according to the present invention 543, 545, 547. The requirements of the next generation interface may include an effective data rate. One such effective data rate requires 100 Mbps throughput in 20 MHz Channel. Of course, lower data rates provide a longer reach between devices supporting the signal format. For example, the graph includes a horizontal axis in MHz representing an offset from the center frequency of a 20 MHz channel and a vertical axis in decibels (dB). In this example, spectral mask 543 may be for each path of a 20 MHz channel with 48 subcarriers of 64 subcarriers being used to carry data. Spectral mask 545 may be for each path of a 20 MHz channel with 52 subcarriers of 64 subcarriers being used to carry data. Spectral mask 547 may be for each path of a 20 MHz channel with 54 subcarriers of 64 subcarriers being used to carry data.

For 100 Mbps throughput, 130 Mbps is typically required at the PHY of the servicing devices. Other requirements may include for example, a particular frame format, e.g., 4096 byte frames, a number of frames in a burst, e.g., 10 frames in a burst (802.11e TXOP bursting), and support of features to prevent inter-device conflicts, e.g., RTS/CTS. To meet these various requirements, MIMO devices are contemplated.

For a two TX path MIMO device/system, additional characteristics are also required to be selected. For example, a system may be specified having the following various characteristics:

2 TX Path MIMO
    48 subcarriers*2 paths/4.0 microseconds=24 Msym/sec
    130/24=5.416 bits/symbol
    64 QAM—rate 0.9 code
    128 QAM—rate 0.7737 code
    256 QAM—rate 0.677 code
    Preferable to add some more carriers, if possible
    Alternating pilot subcarriers on different TX streams Each of these combinations of characteristics meets the requirements for the next generation system. These combinations may be further characterized as follows:

Option #1—Larger constellation
    50 subcarriers active per stream (2 pilots per stream alternating)
    (−21,−7),(−21,7),(−21,21),(−7,7),(−7,21),(7,21) on path 1
    (7,21),(−7,21),(−7,7),(−21,21),(−21,7),(−21,−7) on path 2
    128 QAM
    Rate 0.742->0.75 code rate Option #2—Higher Rate code
    52 subcarriers active per stream (2 pilots per stream alternating+2 additional tones at bins +/−27)
    64 QAM
    Rate 5/6 code Option #3—Shorter Cyclic Prefix
    52 data subcarriers per stream
    cut cyclic prefix in half (0.4 microsecond cyclic prefix->3.6 microsecond symbol)
    64 QAM
    rate 3/4 code Each of these combinations provides various advantages and disadvantages while meeting the requirements set forth, each in the context of a two antenna MIMO system. With the MIMO signal format of the next generation WLAN system, smaller constellations and lower code rates may be employed while still providing a longer reach and an equal or greater data rate, as compared to legacy IEEE 802.11a/g systems. For example, a 2 by 2 MIMO system using a 20 MHz channel supports 12, 24, and 48 Mbps rates. Further, a 2 by 2 MIMO system using a 40 MHz channel supports 27 and 54 Mbps. Each of these next generation systems provides operational advantages over legacy IEEE 802.11a/g systems. Further, with a 4 by 4 MIMO system, higher data rates are supported using comparable coding rates to legacy IEEE 802.11a/g systems. In particular, a 4 by 4 MIMO system using a 3/4 coding rate (as in IEEE 802.11a/g) in a 20 MHz channel supports 192 Mbps. Further, a 4 by 4 MIMO system using a 3/4 coding rate (as in IEEE 802.11a/g) in a 40 MHz channel supports 486 Mbps.

In one embodiment, a method for transmitting high rate data within a multiple input multiple output (MIMO) wireless local area network (WLAN) begins by determining a data transmission rate. The method continues by, when the data transmission rate is between a first data rate and a second data rate, enabling two transmission paths. The method continues by, for each of the two transmission paths, determining at least one of: level of constellation, number of data subcarriers, rate code, and cyclic prefix duration.

In another embodiment, a method for supporting high data rate WLAN communications begins by determining a bandwidth of operation. The method continues by determining a required data throughput rate. The method continues by selecting a number of antennas for use in a Multiple Input Multiple Output (MIMO) baseband signal format. The method continues by selecting a constellation. The method continues by operating a MIMO WLAN transceiver according to the bandwidth of operation, the number of antennas, and the constellation to meet the required data throughput rate.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for updating a channel estimation based on payload of a frame. As one of average skill in the art will appreciate, other embodiments may be derived from the present discussion without deviating from the scope of the claims.

What is claimed is:

1. A method for transmitting high rate data within a multiple input multiple output (MIMO) wireless local area network (WLAN), the method comprises:
    selecting one of a plurality of predetermined data rates for a data transmission rate;
    when the selected data transmission rate is between a first predetermined data rate and a second predetermined data rate of the plurality of predetermined data rates, enabling two transmission paths and activating two antennas for use in the two transmission paths;
    when the data transmission rate is greater than the second predetermined data rate, enabling four transmission paths and activating four antennas for use in the four transmission paths;
    for each of the enabled transmission paths, determining the following to provide the data transmission rate over the enabled transmission paths: channel bandwidth; level of constellation; number of data subcarriers; rate code; and cyclic prefix duration; and
    operating a MIMO WLAN transceiver to transmit at the data transmission rate over the enabled transmission paths according to the determined channel bandwidth; level of constellation, number of data subcarriers, rate code, and cyclic prefix duration.

2. The method of claim 1, wherein the enabling the two transmission paths comprises at least one of:
    activating two antennas for a 20 MHz channel; and
    activating two antennas for a 40 MHz channel.

3. The method of claim 1, wherein the level of constellation comprises at least one of:
    64 Quadrature Amplitude Modulation (QAM);
    128 QAM; and
    256 QAM.

4. The method of claim 3, wherein the determining the number of data subcarriers when the level of constellation is 64 QAM comprises at least one of:
    selecting 52 subcarriers of 64 subcarriers for carrying data; and
    selecting 54 subcarriers of 64 subcarriers for carrying data.

5. The method of claim 4 comprises, when 52 subcarriers are selected:
    utilizing alternating two pilot subcarriers per each of the two transmission paths; and
    selecting a rate 5/6 code.

6. The method of claim 4 comprises, when 54 subcarriers are selected:
    utilizing alternating two pilot subcarriers per each of the two transmission paths; and
    utilizing subcarriers +27 and −27 for carrying data.

7. The method of claim 4 comprises, when 52 subcarriers are selected:
    reducing cyclic prefix; and
    selecting a rate 3/4 code.

8. The method of claim 4 further comprises:
    adjusting a spectral mask based on the number of subcarriers selected.

9. The method of claim 1 further comprises:
    when the data transmission rate is less than the first predetermined data rate due to distance, enabling the two transmission paths to utilize a 20 MHz channel with code rates less than 3/4 for 12, 24, or 48 Mbps (Mega bits per second) data rates or enabling the two transmission paths to utilize a 40 MHz with code rates less than 3/4 for 27 or 54 Mbps data rates.

10. The method of claim 1 further comprises:
    when the data transmission rate is greater than the second predetermined data rate, enabling four transmission paths utilizing a 20 MHz channel and a code rate of 3/4 for 192 Mbps data rate or enabling the four transmission paths utilizing a 40 MHz channel and a code rate of 3/4 for 486 Mbps data rate.

11. A transmitter comprises:
    baseband processing module; and
    a plurality of radio frequency (RF) transmitters, wherein the processing module functions to:
        select one of a plurality of predetermined data rates for a data transmission rate;
        when the selected data transmission rate is between a first predetermined data rate and a second predetermined data rate of the plurality of predetermined data rates, enable two transmission paths and activate two antennas for use in the two transmission paths;
        when the data transmission rate is greater than the second predetermined data rate, enable four transmission paths and activate four antennas for use in the four transmission paths;
        for each of the enabled transmission paths, determine the following to provide the data transmission rate over the enabled transmission paths: channel bandwidth; level of constellation; number of data subcarriers; rate code; and cyclic prefix duration; and operate a MIMO WLAN transceiver to transmit at the data transmission rate over the enabled transmission paths according to the determined channel bandwidth; level of constellation, number of data subcarriers, rate code, and cyclic prefix duration.

12. The transmitter of claim 11, wherein the baseband processing module functions to enable the two of the plurality of RF transmitters by at least one of:

activating the two of the plurality of RF transmitters for a 20 MHz channel; and activating the two of the plurality of RF transmitters for a 40 MHz channel.

13. The transmitter of claim 11, wherein the level of constellation comprises at least one of:

64 Quadrature Amplitude Modulation (QAM);
128 QAM; and
256 QAM.

14. The transmitter of claim 13, wherein the determining the number of data subcarriers when the level of constellation is 64 QAM comprises at least one of:

selecting 52 subcarriers of 64 subcarriers for carrying data; and selecting 54 subcarriers of 64 subcarriers for carrying data.

15. The transmitter of claim 14, wherein the baseband processing module further functions to, when 52 subcarriers are selected:

utilize alternating two pilot subcarriers per frame for each of the two of the plurality of RF transmitters; and select a rate 5/6 code.

16. The transmitter of claim 14, wherein the baseband processing module further functions to, when 54 subcarriers are selected:

utilize alternating two pilot subcarriers per frame for each of the two of the plurality of RF transmitters; and utilize subcarriers +27 and −27 per frame for carrying data.

17. The transmitter of claim 14, wherein the baseband processing module further functions to, when 52 subcarriers are selected:

reduce cyclic prefix of a frame; and
select a rate 3/4 code.

18. The transmitter of claim 14, wherein the baseband processing module further functions to:

adjust a spectral mask based on the number of subcarriers selected.

19. The transmitter of claim 11, wherein the baseband processing module further functions to:

when the data transmission rate is less than the first predetermined data rate due to distance, enable the two of the plurality of RF transmitters to utilize a 20 MHz channel with code rates less than 3/4 for 12, 24, or 48 Mbps (Mega bits per second) data rates or enabling the two of the plurality of RF transmitters to utilize a 40 MHz with code rates less than 3/4 for 27 or 54 Mbps data rates.

20. The transmitter of claim 11, wherein the baseband processing module further functions to:

when the data transmission rate is greater than the second predetermined data rate, enable four of the plurality of RF transmitters utilizing a 20 MHz channel and a code rate of 3/4 for 192 Mbps data rate or enabling the four of the plurality of RF transmitters utilizing a 40 MHz channel and a code rate of 3/4 for 486 Mbps data rate.

* * * * *